(12) United States Patent
Sathish et al.

(10) Patent No.: US 8,687,946 B2
(45) Date of Patent: Apr. 1, 2014

(54) METHOD AND APPARATUS FOR ENRICHING MEDIA WITH META-INFORMATION

(75) Inventors: Sailesh Kumar Sathish, Tampere (FI); Sujeet Shyamsundar Mate, Tampere (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 13/307,483

(22) Filed: Nov. 30, 2011

(65) Prior Publication Data

US 2013/0136416 A1 May 30, 2013

(51) Int. Cl.
*G11B 27/00* (2006.01)
*H04N 5/93* (2006.01)

(52) U.S. Cl.
USPC ............... 386/278; 386/E9.011; 386/239

(58) Field of Classification Search
USPC ............................................. 386/224
See application file for complete search history.

(56) References Cited

U.S. PATENT DOCUMENTS

| | | | |
|---|---|---|---|
| 6,353,823 B1 | 3/2002 | Kumar | |
| 6,714,909 B1 | 3/2004 | Gibbon et al. | |
| 7,613,691 B2 | 11/2009 | Finch | |
| 2007/0094251 A1 | 4/2007 | Lu et al. | |
| 2008/0243607 A1 | 10/2008 | Rohan et al. | |
| 2010/0131895 A1* | 5/2010 | Wohlert | 715/811 |
| 2010/0199295 A1 | 8/2010 | Katpelly et al. | |
| 2010/0250533 A1 | 9/2010 | Agro et al. | |
| 2010/0274667 A1 | 10/2010 | Lanham et al. | |

OTHER PUBLICATIONS

A. Tomohisa et al., Annotation Method for Video Content Based on Application of Semantic Graph, Journal, 2005, p. 1, vol. 59, No. 11, Japan.
H. Zhuge et al., Peer-to-Peer in Metric pace and Semantic Space, Journal, Jun. 2007, pp. 1-6, vol. 19, Issue 6, IEEE Educational Activities Department Piscataway, NJ, USA.
H. Zhuge, Communities and Emerging Semantics in Semantic Link Network: Discovery and Learning, Jun. 2009, pp. 1-2, vol. 21, No. 6, Institute of Computing Technology, Chinese Academy of Sciences, Beijing.
Knight Foundation, Link Media brings semantic search technology to its international news site, Aug. 3, 2011, pp. 1-3.
M. Robertson, Semantic Video Search Indexing and Concept Detection, video, 2012, pp. 1-3, ReelVideo, LLC, http://reelseo.com/semantic-video-indexing/.

(Continued)

*Primary Examiner* — Thai Tran
*Assistant Examiner* — Girumsew Wendmagegn
(74) *Attorney, Agent, or Firm* — Ditthavong Mori & Steiner, P.C.

(57) ABSTRACT

An approach is provided for enriching media with meta-information blocks. Specifically, one or more segments of one or more media files are processed to determine meta-information (e.g., topics, annotations, meta-data, etc.) related to the one or more segments. Based on the determined meta-information, other media or related meta-information is determined, analyzed, and appended to the original media as one or more meta-blocks. One or more relationships among the original and other media is then determined. Based on the determination of the one or more relationships, topic blocks (i.e., multi-topic links) are generated and associated with the original and other media. The addition of the meta-blocks and topic blocks to the original media enables either a renderer or a service to generate one or more composite media (e.g., a video mashup) based on the navigation and analysis of media determined as a result of traversing the one or more topic blocks.

20 Claims, 10 Drawing Sheets

(56) References Cited

OTHER PUBLICATIONS

Oktie Hassanzadeh et al., A Declarative Framework for Semantic Link Discovery over Relational Data, Apr. 2009, pp. 1101-1102, Madrid, Spain.

International Search Report for related International Patent Application No. PCT/FI2012/050996 dated Dec. 11, 2013, pp. 1-4.

Written Opinion for related International Patent Application No. PCT/FI2012/050996 dated Dec. 11, 2012, pp. 1-6.

* cited by examiner

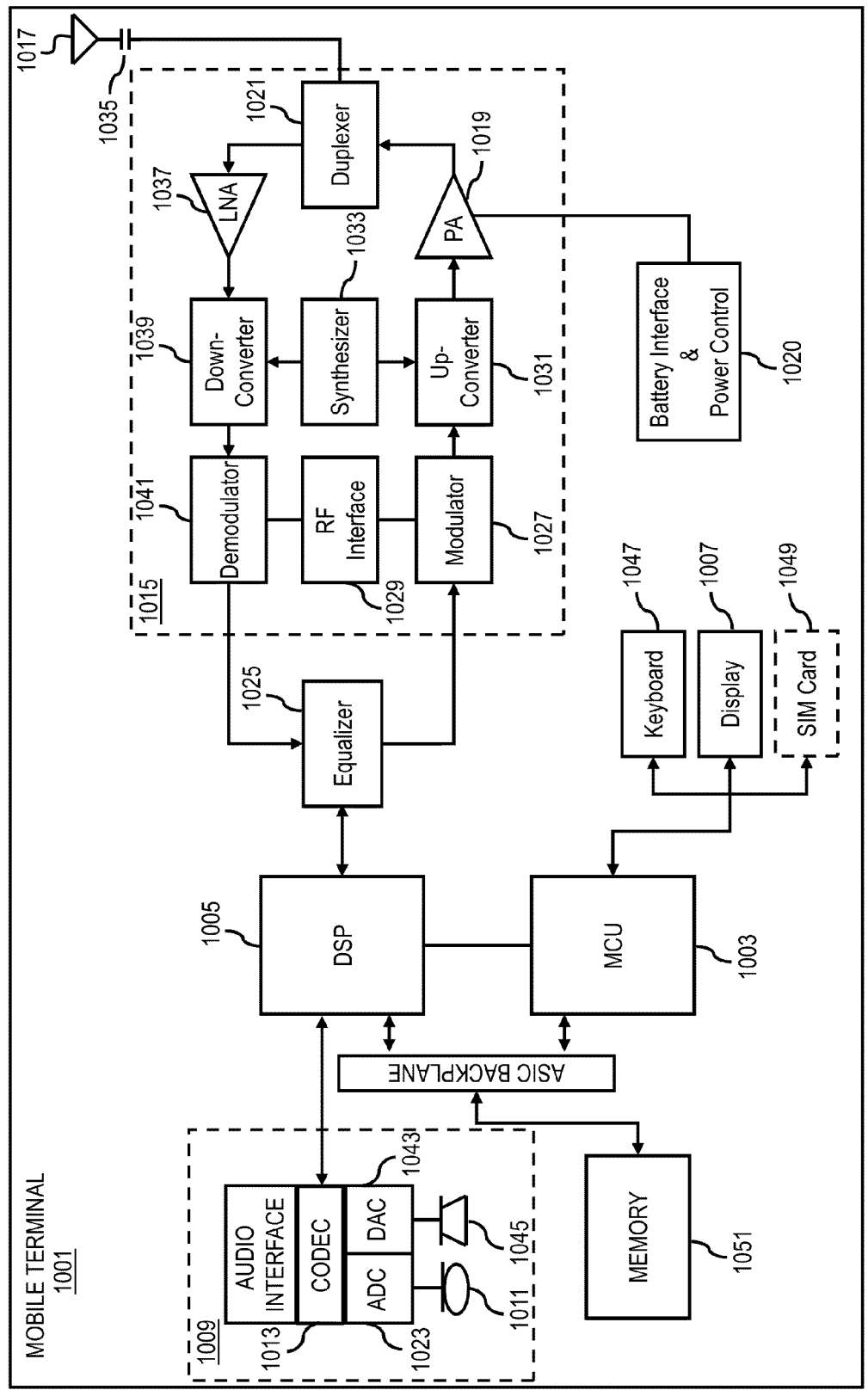

METHOD AND APPARATUS FOR ENRICHING MEDIA WITH META-INFORMATION

BACKGROUND

Service providers and device manufacturers (e.g., wireless, cellular, etc.) are continually challenged to deliver value and convenience to consumers by, for example, providing compelling network services. One area of interest has been the development and provisioning to users of rich multimedia (i.e., interactive media). In particular, there is a growing interest among users for media that is interactive and can be personalized based on one's own interests and/or curiosities. However, the current approach to rich media is focused on gathering, hosting, and/or providing content rather than evolving the potential interactive quality of the media. Moreover, the current use of meta-information and/or metadata associated with most media is pretty limited and therefore further inhibits the interactive potential of the media. Therefore, service providers and device manufacturers face significant technical challenges in providing a service that allows consumers to experience rich multimedia in a manner that enables a host of new experiences to be developed.

SOME EXAMPLE EMBODIMENTS

Therefore, there is a need for an approach for enriching media with meta-information blocks.

According to one embodiment, a method comprises processing and/or facilitating a processing of one or more media segments of one or more media files to determine characterization data associated with the one or more media segments. The method also comprises processing and/or facilitating a processing of the characterization data to determine one or more other media files, one or more other media segments, or a combination thereof. The method further comprises determining to associate the one or more other media files, the one or more other media segments, or a combination thereof to the one or more media segments, the one or more media file, or a combination thereof as meta-information.

According to another embodiment, an apparatus comprises at least one processor, and at least one memory including computer program code for one or more computer programs, the at least one memory and the computer program code configured to, with the at least one processor, cause, at least in part, the apparatus to process and/or facilitate a processing of one or more media segments of one or more media files to determine characterization data associated with the one or more media segments. The apparatus is also caused to process and/or facilitate a processing of the characterization data to determine one or more other media files, one or more other media segments, or a combination thereof. The apparatus is further caused to determine to associate the one or more other media files, the one or more other media segments, or a combination thereof to the one or more media segments, the one or more media file, or a combination thereof as meta-information.

According to another embodiment, a computer-readable storage medium carries one or more sequences of one or more instructions which, when executed by one or more processors, cause, at least in part, an apparatus to process and/or facilitate a processing of one or more media segments of one or more media files to determine characterization data associated with the one or more media segments. The apparatus is also caused to process and/or facilitate a processing of the characterization data to determine one or more other media files, one or more other media segments, or a combination thereof. The apparatus is further caused to determine to associate the one or more other media files, the one or more other media segments, or a combination thereof to the one or more media segments, the one or more media file, or a combination thereof as meta-information.

According to another embodiment, an apparatus comprises means for processing and/or facilitating a processing of one or more media segments of one or more media files to determine characterization data associated with the one or more media segments. The apparatus also comprises means for processing and/or facilitating a processing of the characterization data to determine one or more other media files, one or more other media segments, or a combination thereof. The apparatus further comprises means for determining to associate the one or more other media files, the one or more other media segments, or a combination thereof to the one or more media segments, the one or more media file, or a combination thereof as meta-information.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method of any of originally filed claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIG. 10 is a diagram of a mobile terminal (e.g., handset) that can be used to implement an embodiment of the invention.

DESCRIPTION OF SOME EMBODIMENTS

Examples of a method, apparatus, and computer program for enhancing multimedia through newer modes of meta-information are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

As used herein, the term media refers to any type of media that may include, for example, one or more images, one or more fragments or portions of images, one or more animated images, one or more fragments or portions of animated images, one or more videos, one or more fragments or portions of videos, or a combination thereof, where the media may be two-dimensional, three-dimensional, single view, multiple views, or a combination thereof. Although various embodiments are described with respect to images and videos, it is contemplated that the approach described herein may be used with other type of content that can be segmented according to one or more characteristics associated with the media (e.g., topic disambiguation, scene disambiguation, etc.).

Figure 1:
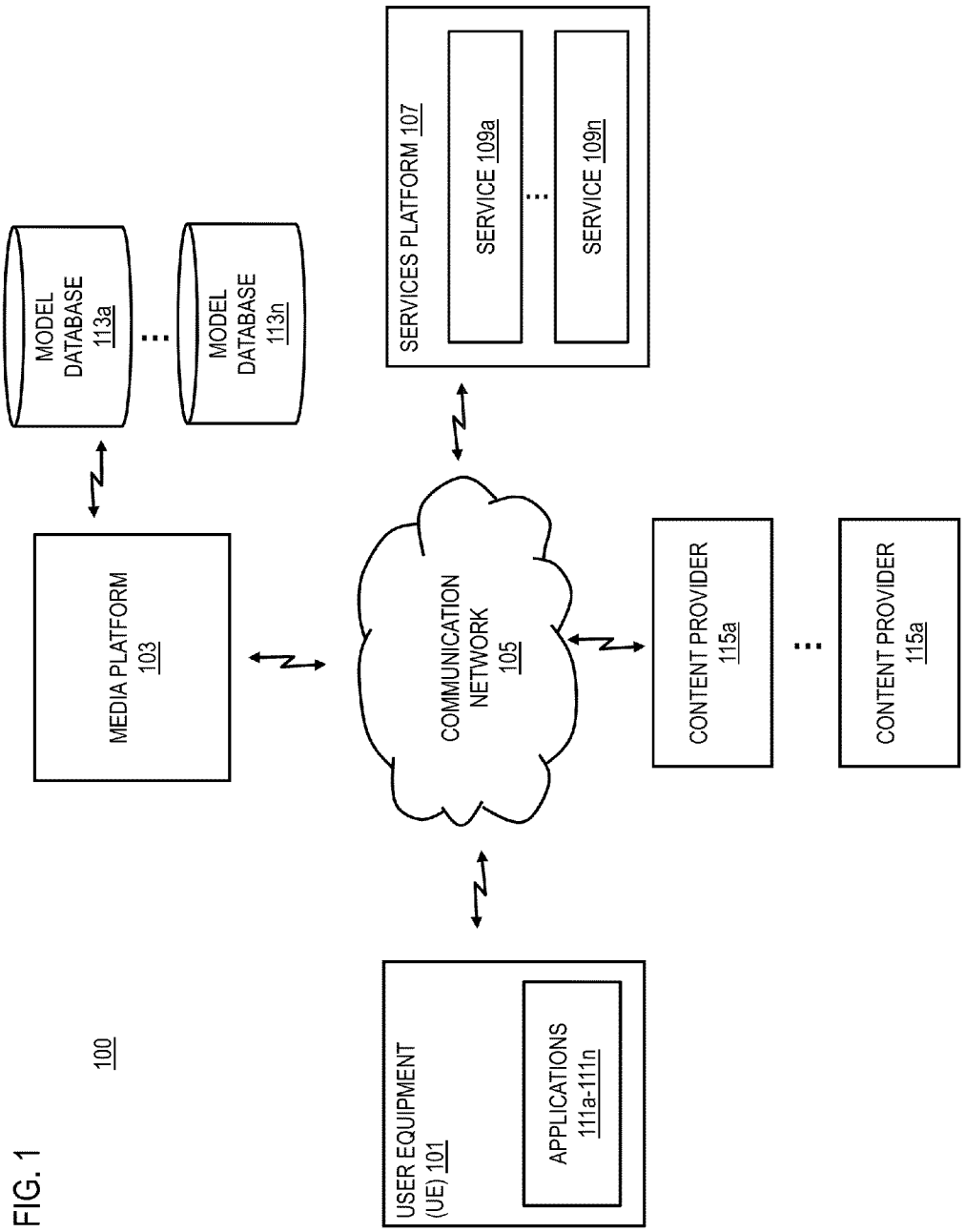
FIG. 1 is a diagram of a system capable of enriching media with meta-information blocks, according to one embodiment.

FIG. 1 is a diagram of a system capable of enriching media with meta-information blocks, according to one embodiment. As previously discussed, there is an increasing interest on the part of service providers and device manufacturers to develop and provide consumers with rich multimedia (i.e., interactive media). In particular, there is a growing interest among users for media that is interactive and can be personalized depending on one's own interests and/or curiosities. However, the current approach to rich multimedia is focused on gathering, hosting, and/or providing content. Moreover, the current use of meta-information and/or metadata associated with most media is pretty limited and therefore further inhibits the interactive potential of the media.

By way of example, a user may want to watch a media presentation about elephants. Current rich multimedia (e.g., a Digital Video Disk (DVD)) can offer a user some interaction and control over the media. For example, the user may be able to control the playback of the video (e.g., pausing, fast-forwarding, skipping chapters, etc.), the video's display (e.g., aspect ratio), and/or the video's presentation language (e.g., subtitles, Spanish, French, etc.). In some instances, the user may also have some control over the particular rendering of the content (e.g., selecting an alternative ending and/or one or more deleted scenes). However, the current alternatives are typically limited and rarely allow a user to explore different topics associated with the media.

To address this problem, a system 100 of FIG. 1 introduces the capability to enrich media with meta-information blocks. In one embodiment, the system 100 first segments one or more media files (e.g., a video) into one or more segments based, at least in part, on one or more characteristics of the media defined within the system 100 (e.g., topic disambiguation, scene disambiguation, etc.). The system 100 then determines and processes the meta-information related to the one or more media segments (e.g., topics, annotations, meta-data, context information, etc.). Based on the processed meta-information, the system 100 determines, analyzes, and appends one or more other media files, one or more other media segments, the meta-information associated with the one or more media files, the one or more media segments, or a combination thereof (also collectively referred to as meta-blocks) as additional meta-information to the one or more media files, the one or more media segments, or a combination thereof. More specifically, in one embodiment, the system 100 appends the one or more other media files, the one or more other media segments, the one or more related meta-blocks, or a combination thereof to the original media in between the frames of the original media. In another embodiment, the system 100 can append the one or more other media files, the one or more other media segments, the one or more related meta-blocks, or a combination thereof to the original media as a metadata file including index information that points to the specific frame where the one or more other media files, the one or more other media segments, the one or more related meta-blocks, or a combination thereof is applicable. In a further embodiment, the system 100 can append the one or more other media files, the one or more other media segments, the one or more related meta-blocks, or a combination thereof to the original media as a separate stream in addition to the original media streams (e.g., audio stream, video stream, meta-information stream, etc.).

In one embodiment, the one or more other media files, the one or more other media segments, the one or more related meta-blocks, or a combination thereof determined, analyzed, and appended by the system 100 can include and/or reference any type of media such as audio, videos, images, gesture patterns, advertisements, navigation utilities that are multimodal, etc. In one embodiment, the system 100 associates additional meta-information to the meta-blocks associated with the other media. For example, the added meta-information may describe one or more rendering rules and/or other aspects such as: relevance of the other media to a media segment; topic information, annotations, and/or tags; rendering styles; context under which the other media is relevant; order of presentation; duration of presentation; filter constraints; priority of presentation with respect to other media types; business model information; linkages to other media; topic blocks; copyright information; and/or other information. In addition, the one or more meta-blocks are often already associated with their own metadata (e.g., media type, encoding details, time of creation, location data, annotations, tags, duration, ownership, etc.). In one embodiment, the meta-information associated with the meta-blocks can be used by the system 100, a media server, or rendering engine (e.g., a media player) to service user requests and/or render the composite media.

By way of example, if a user is viewing a video about a visit to California, the system 100 can cause the display of an image of "Mickey Mouse" (based on an embedded image in the video media files or a reference to a meta-block) when the system 100 determines the user is viewing a video segment relating to Disneyland in Anaheim, Calif. In one embodiment, the system 100 can determine to only show the "Mickey Mouse" image if the user specifically requests to view the Disneyland segment of the video. The system 100 can also present to the user the option to view additional media (e.g., web links to videos) if the system 100 determines the user is viewing the composite media on a mobile device (e.g., mobile phone) or the system 100 can present the additional videos themselves if the system 100 determines that the user is watching the composite media on a digital device (e.g., a television) without an internet connection.

In one embodiment, the system 100 also generates one or more topic blocks, which the system 100 then associates with one or more media segments, one or more media files, one or more other media segments, one or more other media files, one or more related meta-blocks, or a combination thereof in order to build multi-type links for new media services. In particular, the one or more topic blocks describe multi-topic links associated with meta-information that allow the system 100, one or more renders, one or more services to generate composite media (e.g., a multi-video mashups) through navigation and analysis of media generated as a result of a user's traversing one or more topic blocks. Further, the system 100 uses topic blocks to link multiple media (e.g., the original media and other media) based, for example, on one or more semantic relationships that exist between the two media. More specifically, the system 100 generates one or more topic blocks where the system 100 determines one or more relational overlaps exist between two or more media.

In an exemplary embodiment, the system 100 generates and uses one or more topic blocks in terms of topic relations, but there can be other services for which topic blocks would be equally relevant. By way of example, the system 100 can generate a topic block "A1" that is about topic "T0", which links media "A" and media "B". More specifically, topic block "A1" can be linked with topic blocks "B1" and "B2" associated with media "B". As a result, the possible topic choices become "T1=A1+B1" and "T2=A1+B2." Accordingly, topic "T0" can evolve into topic "T1" if a user traverses the topic block "B1" or topic "T0" will evolve into topic "T2" if a user traverses the topic block "B2". Thus, each topic can be influenced by the paths that are taken as well as by an increase in possible topic choices. Further, the system 100 enables a user to pre-determine a depth of traversal, an amount of aggregation, or the number of hops (i.e., links to external topic blocks in external media) based, for example, on duration of media, available resources (e.g., speed of internet connection), etc. that may be used in one or more topic block traversals to arrive at building the user's own interactive composite media.

In one embodiment, the system 100 can modify topic blocks as needed. By way of example, the system 100 can activate one or more topic blocks based on the topic that a user is using. More specifically, if the user is using a media segment entitled "California Trip," the topic block "California," which is a parent of the topic block "Disneyland," will be active and topic travel can happen at that level. The one or more topic blocks associated with the one or more media will form a logical hierarchical structure where the levels in the hierarchy are determined by the topic resolutions that have been done for the whole media. In addition, for each topic that is contained within the media, there can be one or more topic blocks associated with it. Topic blocks can also contain "parent" topic block and "child" topic block information. For example, the topic block "A1" that belongs to video segment "A" and that links to topic block "B2" of video segment "B" can be at level 3 in video segment "A" while topic block "B2" can be at level 2 in video segment "B". In another example, the one or more topic blocks themselves can be hierarchical. More specifically, a topic block "Family vacation" can have three other topic blocks within in it related to "India," "Airport," and "My Family." Moreover, in one embodiment, the topic block "Airport," which is part of "Family Vacation" may have a different set of preferences compared with a topic block "Airport" that is part of a topic block "Civil Aviation."

In one embodiment, the system 100 also generates meta-information about one or more topic blocks so that the system 100 can determine how many times a topic block has been accessed by one or more users and for what purpose. Depending on usage patterns, the system 100 can determine one or more probabilistic models that can enable the system 100 to then generate one or more recommendations and/or topic suggestions. The one or more recommendations and/or suggestions can prove particularly helpful when the number of potential choices begins to exponentially increase.

By way of example, the system 100 determines a video segment "A" relating to elephants. The system 100 then generates a topic block for the topic "elephant" that links video segment "A" to video segment "B" as well as video segment "A" to video segment "C". The content of the topic block that describes the link between video segment "A" and video segment "B" shows that video segment "B" is an amateur photo of an elephant found in the public domain. In contrast, the content of the topic block that describes the link between video segment "A" and video segment "C" shows that video segment "C" is a professional video about elephants that is copyright protected and limited to private viewing only. As a result, the system 100 can incorporate a warning relating to video segment "C" should a user want to upload and/or share the composite media on one or more social network services. In addition, it is contemplated that video segment "C" could have additional topic blocks associated with it and/or linked to other related media (e.g., video segment "D" about Amazonian forests). Further, the system 100 can enable a user to build multiple topics as a result of traversing one or more paths generated by "n-number" of linked topic blocks. More specifically, a user in this instance can determine, through use of a user interface (UI), the number of topic blocks within the system 100 to parse iteratively to generate one or more topics (including child topics for the one or more topics) which would be presented by the system 100. In one example, as the depth of a user's topic block traversing increases, the one or more topics can also change. For example, constructing a documentary about elephants could evolve into a video about animal migration or ivory poaching.

As shown in FIG. 1, the system 100 comprises a user equipment (UE) 101 having connectivity to a media platform 103 via a communication network 105. The UE 101 may include one or more applications 111a-111n (also collectively referred to as applications 111) executed by the UE 101. By way of example, exemplary applications 111 may include Internet browsing applications, social network service applications, media sharing applications, and the like. In one embodiment, the applications 111 interface with the media platform 103 to request and/or render media. For example, a user may be interested in viewing a video about Africa, which may also include media related to elephants, ivory poaching, and/or animal migration. In another embodiment, the UE 101 and/or the applications 111 may be used to add one or more other media segments, one or more other media files, one or more related meta-blocks, or a combination thereof to the media platform 103 to be analyzed and appended by the media platform 103 to the one or more media segments, one or more media files, or a combination thereof as meta-information.

In one embodiment, the media platform 103 may include or be associated with one or more media databases 113a-113n (also collectively referred to as media databases 113). The media databases 113 may exist in whole or in part within the media platform 103, or independently. The media databases 113 may include one or more media files, one or more segments of the one or more media files, one or more other media files, one or more other media segments, one or more related meta-blocks, one or more composite media files, one or more composite media segments, or a combination thereof. The various media may also be obtained from one or more content providers 115a-115n (also collectively referred to as content providers 115). The media databases 113 may also include meta-information associated with the various media. In addition, the meta-information associated with the various media may also be obtained from the content providers 115.

The UE 101 is also connected to a service platform 107 via the communication network 105. The service platform 107 includes one or more services 109a-109n (also collectively referred to as services 109). The services 109 may include one or more rendering services, one or more media services, or a combination thereof. The services 109 could also include one or more social network services (e.g., YOUTUBE, FACEBOOK, TWITTER, etc.) that a user can access to upload and/or share one or more composite media with friends, family, and/or associates.

In one embodiment, the media platform 103 processes one or more media segments of one or more media files determined from the media databases 113 and/or the content providers 115 to determine characterization data associated with the media. By way of example, where the media is a video, the media platform 103 may process the video to determine the number of different scenes that exist in the video, which potentially concern different topics and/or objects. For instance, a video may include open grasslands in one scene and thick forestation (e.g., a jungle) in another scene. By way of example, where the media is an image, the media platform 103 may process the image to determine one or more segments within the image that concern different objects. For instance, one segment of the image may concern grasslands and another segment of the image may concern an elephant.

In one embodiment, the media platform 103 determines meta-information related to one or more segments of one or more media files. The type and kind of meta-information determined by the media platform 103 may vary according to the type and kind of media associated with the meta-information. For example, the meta-information may be automatically generated by the device that created the media and may already include information regarding topics, annotations, meta-data, context information, etc. Moreover, the meta-information may be stored within the media databases 113 and/or obtained from the content providers 115. Based on the determined meta-information, the media platform 103 determines, analyzes, and appends one or more other media files, one or more other media segments, one or more related meta-blocks, or a combination thereof as additional meta-information to the one or more media segments, the one or more media files or a combination thereof. In one embodiment, the media platform 103 adds additional meta-information to the one or more appended meta-blocks. For example, the added meta-information may describe one or more rendering rules and/or other aspects such as: relevance of the meta-block to the related segment of video; topic information, annotations, tags; rendering styles; context under which the meta-block is relevant; order of presentation; duration of presentation; filter constraints; priority of presentation with regard to other media types; business model information; linkages to other media; topic blocks; copyright information; and other information. In one example, the other media or the one or more meta-blocks may already contain metadata (e.g., media type, encoding details, time of creation, location data, annotations and tags, ownership, etc.). In one embodiment, the media platform 103 may then determine one or more rendering rules for the UE 101 to enable a user to interact with the composite media. By way of example, the more meta-information the media platform 103 is able to determine regarding the various media, the more potential links the media platform 103 can determine and thereby better enrich the resulting composite media.

In one embodiment, the media platform 103 determines the meta-information and/or metadata associated with the media or meta-blocks to determine one or more relationships to generate one or more topic blocks. More specifically, the media platform 103 associates the one or more topic blocks with one or more other media segments, one or more other media files, one or more related meta-blocks, or a combination thereof associated with and/or appended to the one or more media files, the one or more media segments, or a combination thereof. In one embodiment, the media platform 103 causes a traversal, an aggregation, or a combination of one or more topic blocks to determine one or more composite topic blocks. By way of example, as previously discussed, the media platform 103 can generate a topic block "A1" that is about topic "T0" and that links media "A" and media "B". More specifically, the media platform 103 can link topic block "A1" with topic blocks "B1" and "B2" associated with media "B". In this example, if a user traverses the topic blocks "A1" and "B1", the media platform 103 can generate the composite topic block "A1+B1," which relates to topic T1. Likewise, if a user traverses the topic blocks "A1" and "B2", the media platform 103 can generate the composite topic block "A1+B2," which relates to topic T2. As a result of the particular traversal, aggregation, or combination of one or more topic blocks by a user, the topic "T0" can evolve into "T1" or "T2", respectively. Thus, each topic rendered by the media platform 103 is influenced by the paths that are taken by a user as well as the amount of potential topic choices.

By way of example, the communication network 105 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

The UE 101 is any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UE 101 can support any type of interface to the user (such as "wearable" circuitry, etc.).

By way of example, the UE 101, media platform 103, services platform 107, and content providers 115 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 2:
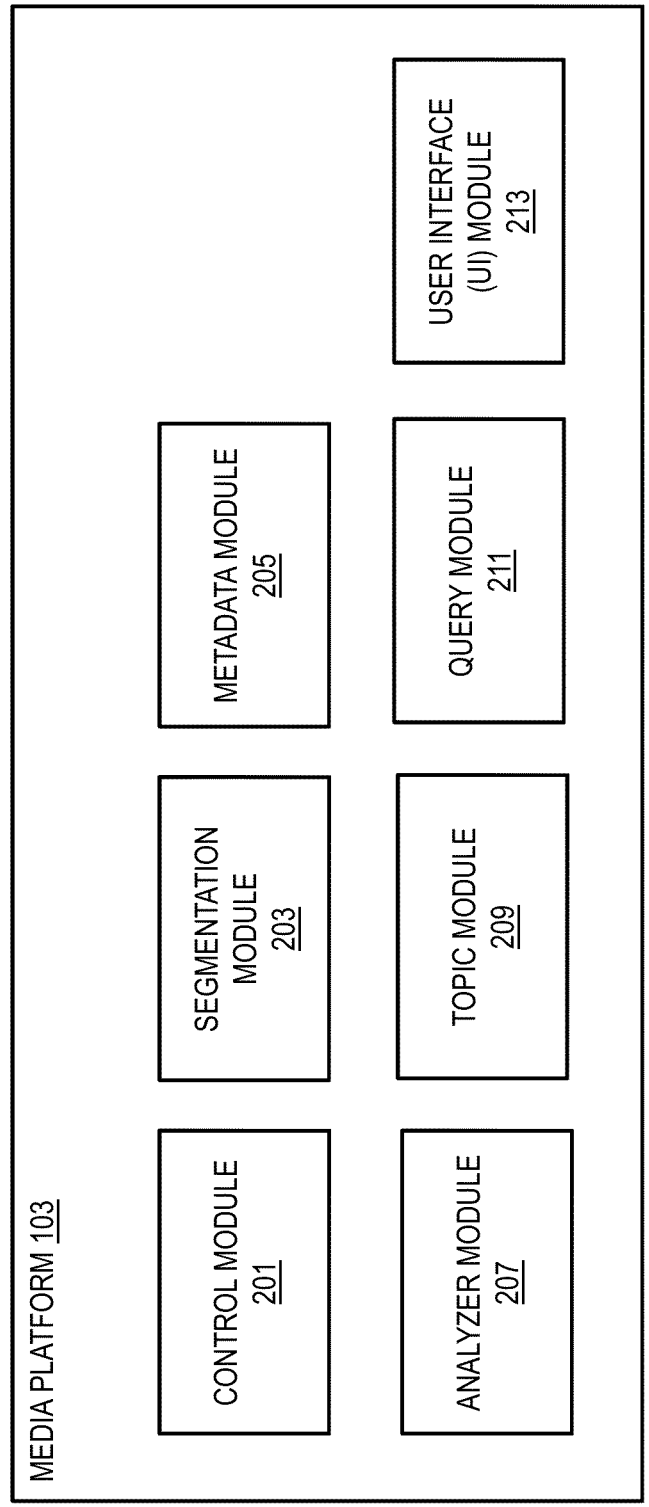
FIG. 2 is a diagram of the components of a media platform, according to one embodiment.

FIG. 2 is a diagram of the components of the media platform 103, according to one embodiment. By way of example, the media platform 103 includes one or more components for enriching media with meta-information blocks. It is contemplated that the functions of these components may be combined in one or more components or performed by other components of equivalent functionality. In this embodiment, the media platform 103 includes a control module 201, a segmentation module 203, a metadata module 205, an analyzer module 207, a topic module 209, a query module 211, and a user interface (UI) module 213.

The control module 201 executes at least one algorithm for executing functions of the media platform 103. For example, the control module 201 may execute an algorithm for processing a query associated with a UE 101 for media associated with one or more topics (e.g., elephants). By way of another example, the control module 201 may execute an algorithm to interact with the segmentation module 203 to cause a segmentation of one or more media files (e.g., a video). The control module 201 may also execute an algorithm to interact with the metadata module 205 to determine the meta-information and/or metadata associated with the one or more media files. The control module 201 also may execute an algorithm to interact with the analyzer module 207 to analyze the one or more media files. The control module 201 may also execute an algorithm to interact with the topic module 209 to generate one or more topic blocks.

The segmentation module 203 segments one or more media files into one or more segments depending on one or more defined characteristics (e.g., scene disambiguation, topic disambiguation, etc.). For media such as video, deviations may occur from one set of frames to another based on changing scenes and/or topics. For media such as images, deviations may occur from one grouping of pixels to another grouping of pixels. In one embodiment, the segmentation module 203 may use deviation thresholds and/or metadata changes to determine one or more deviations. In one embodiment, changes in meta-information and/or metadata, alone, may be used to determine segmentation by the segmentation module 203.

The metadata module 205 processes meta-information and metadata associated with one or more media files. Once the segmentation module 203 determines one or more segments from one or more media files, the meta-information associated with the one or more segments (e.g., topics, annotations, meta-data, context, etc.) is processed and extracted from the media by the metadata module 205. Based on the determined meta-information and/or metadata, the analyzer module 207 can determine and analyze one or more other media segments, one or more other media files, one or more related meta-blocks, or a combination thereof (i.e., meta-blocks) from one or more databases, one or more content providers, or a combination thereof to associate with and/or append to the one or more media segments, one or more media files, or a combination thereof. The metadata module 205 may also be used to process and extract the metadata already associated with the one or more meta-blocks such as media type, encoding details, time of creation, location data, annotations and tags, duration, ownership, etc. Further, the metadata module 205 may be used to add additional meta-information determined from one or more databases, one or more content providers, or a combination thereof to the one or more meta-block such as: relevance of the other media to a media segment; topic information, annotations, and/or tags; rendering styles; context under which the other media is relevant; order of presentation; duration of presentation; filter constraints; priority of presentation with respect to other media types; business model information; linkages to other media; topic blocks; copyright information; and/or other information.

As previously discussed, the analyzer module 207 analyzes the meta-information associated with the one or more segments (e.g., annotations, metadata, contextual data, etc.) to determine one or more other media segments, one or more other media files, one or more related meta-blocks, or a combination thereof from one or more databases, one or more content providers, or a combination thereof. Further, the analyzer module 207 may also be used to process the metadata associated with the one or more meta-blocks (e.g., media type, encoding details, time of creation, location data, annotations and tags, duration, ownership, etc.). In addition, the analyzer module 207 may be used to determine one or more relationships among the one or more media segments, the one or more media files, the one or more other media segments, the one or more other media files, one or more related meta-blocks, or a combination thereof to cause, at least in part, a generation of one or more topic blocks. In one embodiment, the relationship between two media is determined by the analyzer module 207 based, at least in part, on semantic relations that exist between the two media.

The topic module 209, in connection with the analyzer module 207, generates one or more topic blocks based, at least in part, on the one or more relationships determined by the analyzer module 207. The topic module 209 generates one or more topic blocks where the metadata module 205 and/or the analyzer module 207 have determined that a relational overlap exists between two media. In one embodiment, the relational overlap may be based on one or more semantic relations that exist between two media. The topic module 209 may also be used to link the one or more media segments, the one or more media files, the one or more other media segments, the one or more other media files, the one or more related meta-blocks, or a combination thereof with one or more topic blocks generated by the topic module 209. As previously discussed, in one example, the topic module 209 is used to generate topic blocks "A1", "B1", and "B2", which link the media file "A" with the media file "B". As a result, the topic T0 initially associated with the topic block "A1" can evolve into topic T1 if a user traverses the path associated with topic block "B1" or topic T2 if the user traverses the path associated with topic block "B2".

In one embodiment, the topic module 209 is used to determine a hierarchy of the one or more topic blocks, wherein one or more levels of the hierarchy are associated with one or more granularity levels of one or more topics associated with the one or more topic blocks. More specifically, for each topic determined by the analyzer module 207 within one or more meta-blocks, the topic module 209 can generate one or more topic blocks associated with the topic. In one embodiment, the topic module 209 can generate one or more topic blocks that contain "parent and child" topic block information. By way of example, the topic module 209 may be used to generate a topic block "Family Vacation" and then generate three other related topic blocks "India," "Airport," and "My Family" within the topic block "Family Vacation."

The query module 211 receives one or more queries for media (e.g., from the UE 101) and determines media that satisfy the query. The query module 211 interfaces with the user interface module 213 to render the presentation of the user interface for querying the media and for presenting the results of the query. In one embodiment, the query module 209 may be used in connection with the applications 111 to request and/or render media. By way of example, the query module 209 can use topic data determined by the metadata module 208 and/or the analyzer module 207 to create query structures that may be suitable for one or more search engines, one or more databases, one or more content providers, or a combination thereof. The query module 211, in connection with the analyzer module 207, can then determine related media and meta-information, which the topic module 209 can use to generate one or more topic blocks.

In one embodiment, the query module 211 may be used to determine the information contained within one or more topic blocks generated by the topic module 209 in order to determine how many times the one or more topic blocks have been accessed by one or more users and for what purpose. Depending on usage patterns, one or more probabilistic models can be determined by the query module 211 that point to interest aspects of a user. In one example, this information can be used by the query module 211 as an additional filter for generating one or more topic suggestions when a user is traversing multiple hops (i.e., links) of one or more topic blocks.

Figure 7:
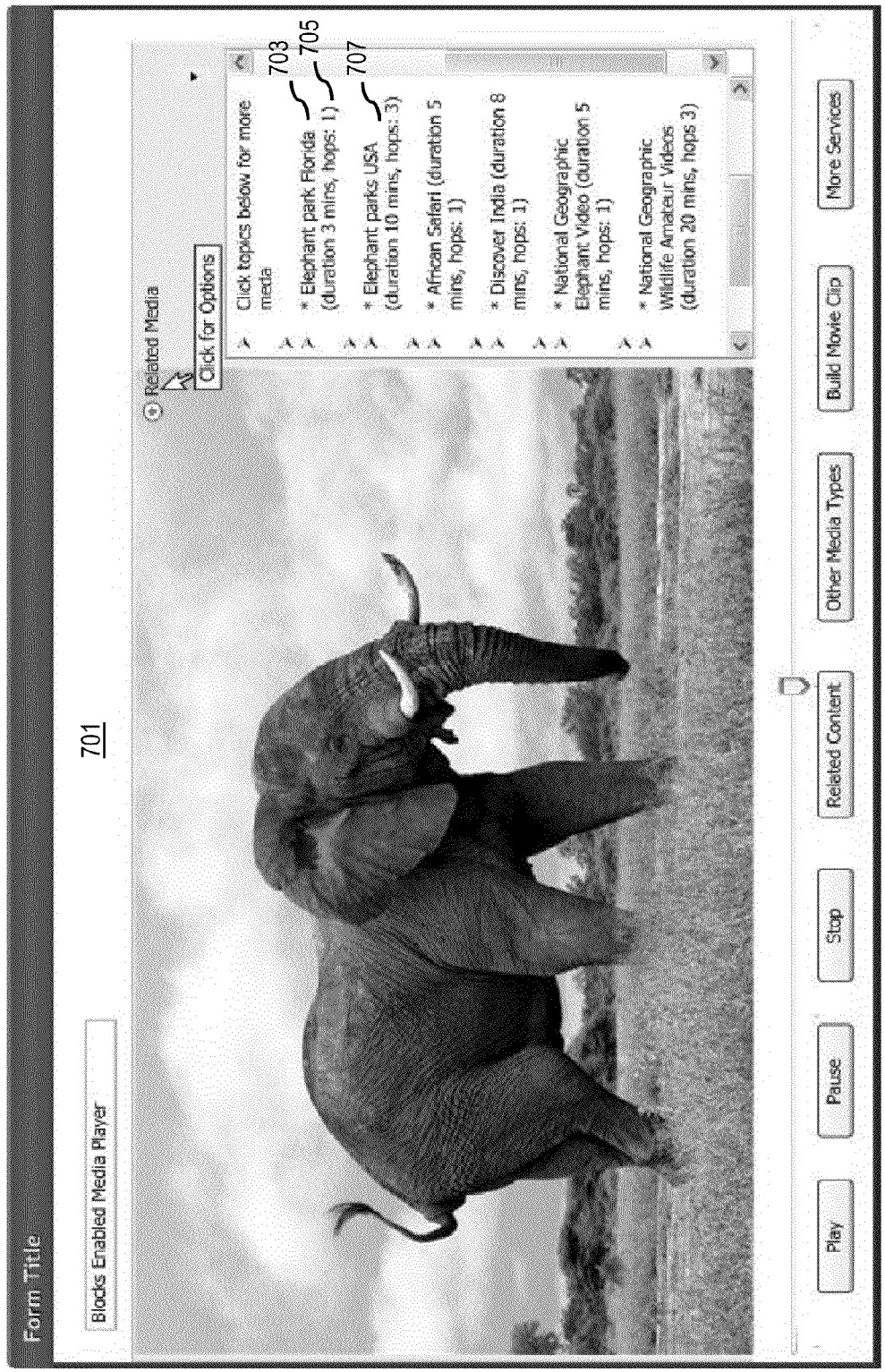
FIG. 7 is a diagram of a user interface utilized in the processes of FIGS. 4 and 5, according to various embodiments.

The UI module 213 causes a rendering of a user interface associated the query and/or rendering of media. In one embodiment, the UI module 213 is used to determine one or more rendering rules for the one or more media segments, the one or more media files, the one or more other media, the one or more other media files, the one or more related meta-blocks, or a combination thereof. The UI module 213 in connection with the metadata module 205 may be used to include one or more rules in the meta-information associated with the media. By way of example, the one or more rendering rules can include, at least in part, one or more criteria for initiating a rendering of the media. Further, the UI module 213 may be used to determine one or more rendering rules that specify, at least in part, one or more user interface elements for interacting with the media. By way of example, the UI module 213 may present a user with the option to navigate or traverse a composite media by selecting one or more topics based on duration and/or hops. An illustrative example of a media player UI is depicted in FIG. 7.

Figure 3:
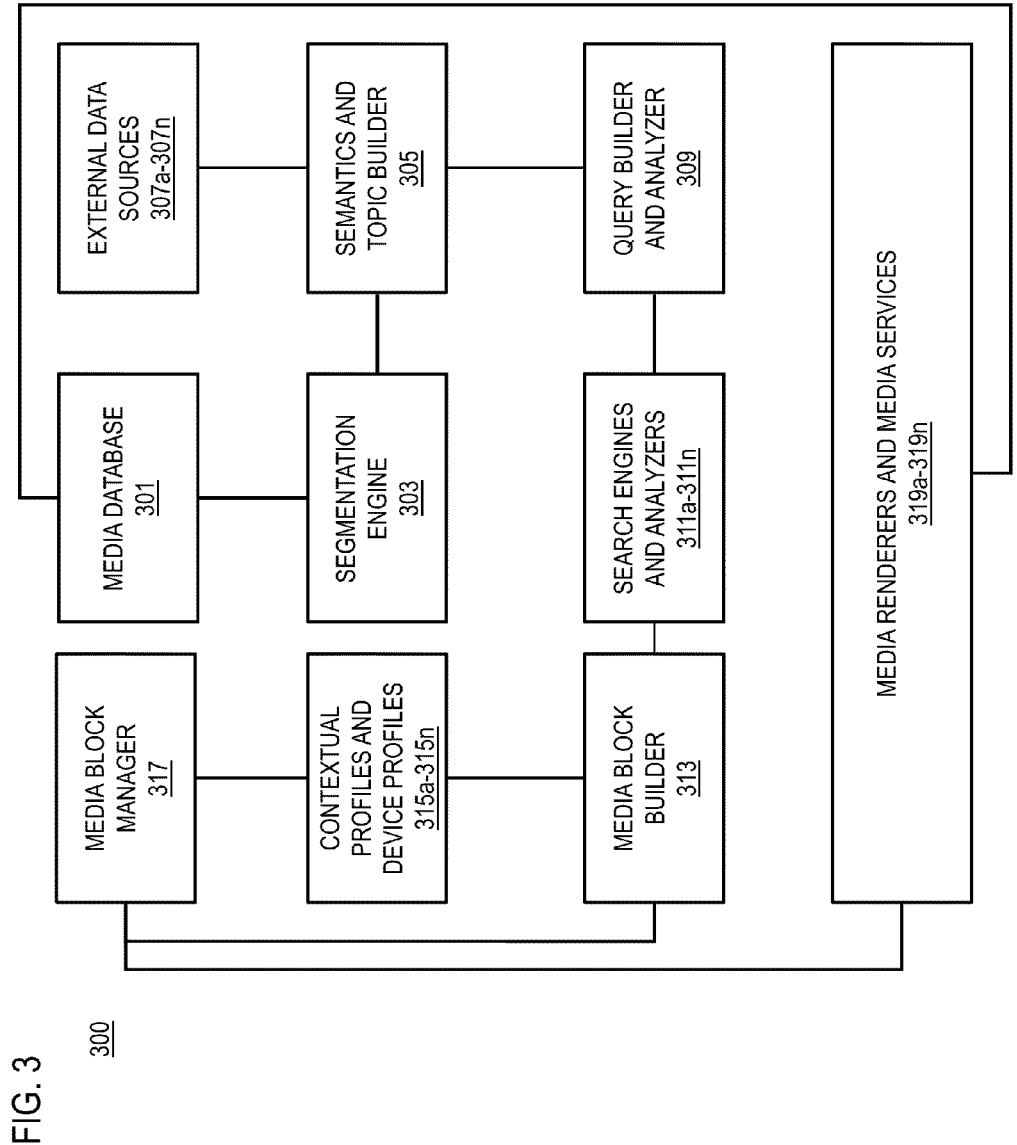
FIG. 3 is a diagram of the components of a media platform, according to one embodiment.

FIG. 3 is a diagram of the components of the media platform 103, according to one embodiment. By way of example, the media platform 103 includes one or more components for enriching media with meta-information blocks. It is contemplated that the functions of these components may be combined in one or more components or performed by other components of equivalent functionality. In this embodiment, the media platform 103 includes a media database 301, a segmentation engine 303, a semantics and topic builder 305, one or more external data sources 307a-307n (also collectively referred to as external data sources 307), a query builder and analyzer 309, one or more search engines and analyzers 311a-311n (also collectively referred to as search engines and analyzes 311), a media block builder 313, one or more contextual profiles and device profiles 315a-315n (also collectively referred to as contextual profiles and device profiles 315), a media block manager 317, and one or more media renderers and media services 319a-319n (also collectively referred to as media renderers and media services 319).

The media database 301 provides one or more non-analyzed media files (e.g., a video) to the segmentation engine 303 to process. The segmentation engine 303 processes the one or more media files to determine one or more segments of the one or more media files based on one or more defined characteristics such as topic disambiguation, scene disambiguation, etc. The one or more segments are then processed by the semantics and topic builder 305, which analyzes the meta-information associated with the segment (e.g., annotations, metadata, contextual data, etc.) in order to generate a topic description for each segment. The semantics and topic builder 305 may also interact with the external data sources 307 depending on the content and the one or more segments being analyzed to determine additional meta-information related to the one or more segments (e.g., annotations, metadata, etc.). By way of example, the semantics and topic builder 305 may determine multiple hierarchies within the one or more segments. More specifically, the semantics and topic builder 305 may determine to break down a higher level topic into one or more specific topics based, for example, on one or more granularity levels associated with the one or more topics. Further, the semantics and topic builder 305 generates topics and annotations for the one or more analyzed segments.

The query builder and analyzer 309 process the topic data and annotations generated by the semantics and topic builder 305 to generate query structures that may be suitable for one or more search engines as well as one or more databases. The search engines and analyzers 311 determine and obtain one or more other media files, one or more other media segments, one or more meta-blocks, or a combination thereof as well as related meta-information that are then further filtered by the search engines and analyzers 311 for quality assurance purposes. The media block builder 313 then generates one or more media blocks, one or more meta-blocks, or a combination thereof depending on the one or more other files, the one or more other media segments, the one or more related meta-blocks, or a combination thereof determined by the search engines and analyzers 311. In one embodiment, the media block builder 313 also uses multiple device profile information and contextual information determined from the contextual profiles and device profiles 315. By way of example, contextual information defined through standard context ontologies can provide cues as to which context is appropriate for a particular media type and/or content. The multiple device profile information and contextual information determined from the contextual profiles and device profiles 315 is used by the media block builder 313 to further enhance the meta-information contained within the one or more media blocks, the one or more meta-blocks, or a combination thereof. The media block manager 317 provides management functionalities that include determining to associate one or more media blocks, one or more meta-blocks, or a combination thereof to the appropriate one or more segments and managing the editing of the one or more media blocks, the one or more meta-blocks, or a combination thereof. In one embodiment, the media block manager 317 can process one or more queries for media from one or more media renderers and media services 319. The media block manager 317 may also be used to filter one or more media blocks, one or more meta-blocks, or a combination thereof based, at least in part, on one or more users' requests. As a result, one or more of the media blocks, one or more of the meta-blocks, or a combination thereof may not need to be transmitted by the media block manager 317 in response to a request for media. In this instance, the one or more media blocks, the one or more meta-blocks, or a combination thereof that are irrelevant to a particular request are filtered out by the media block manager 317.

Figure 4:
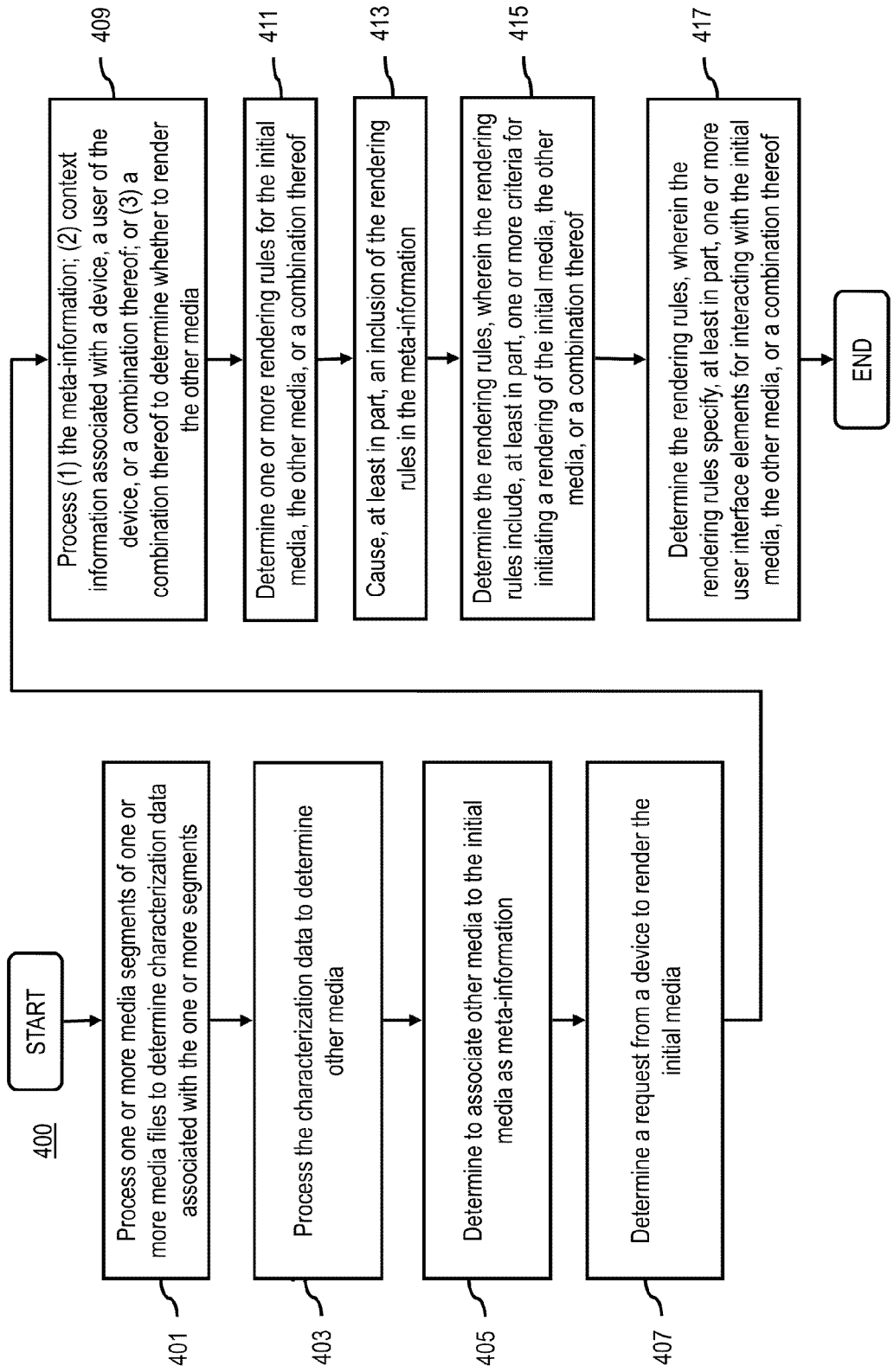
FIGS. 4 and 5 are flowcharts of processes for enriching media with meta-information blocks, according to one embodiment.
Figure 5:
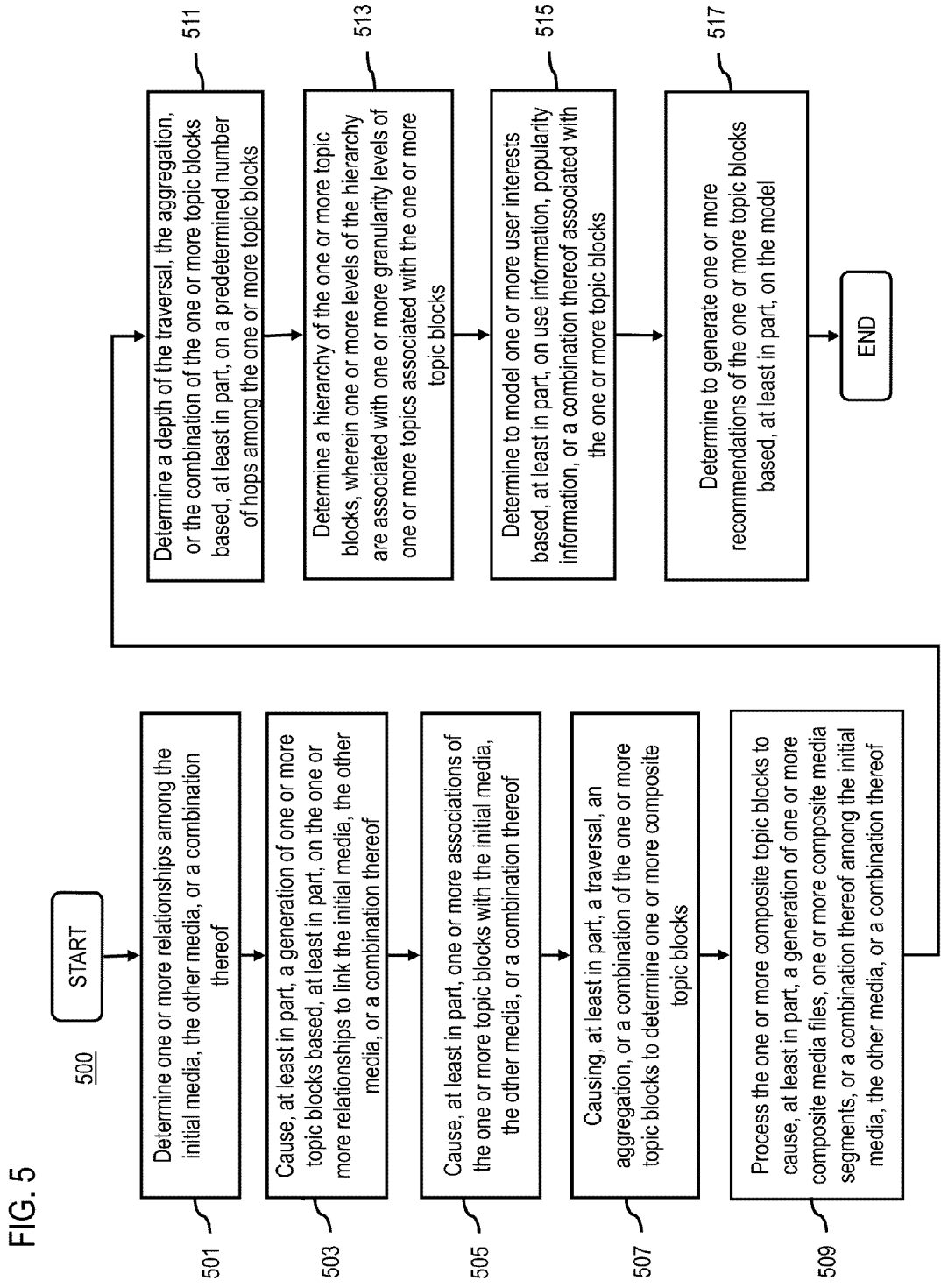
Figure 9:
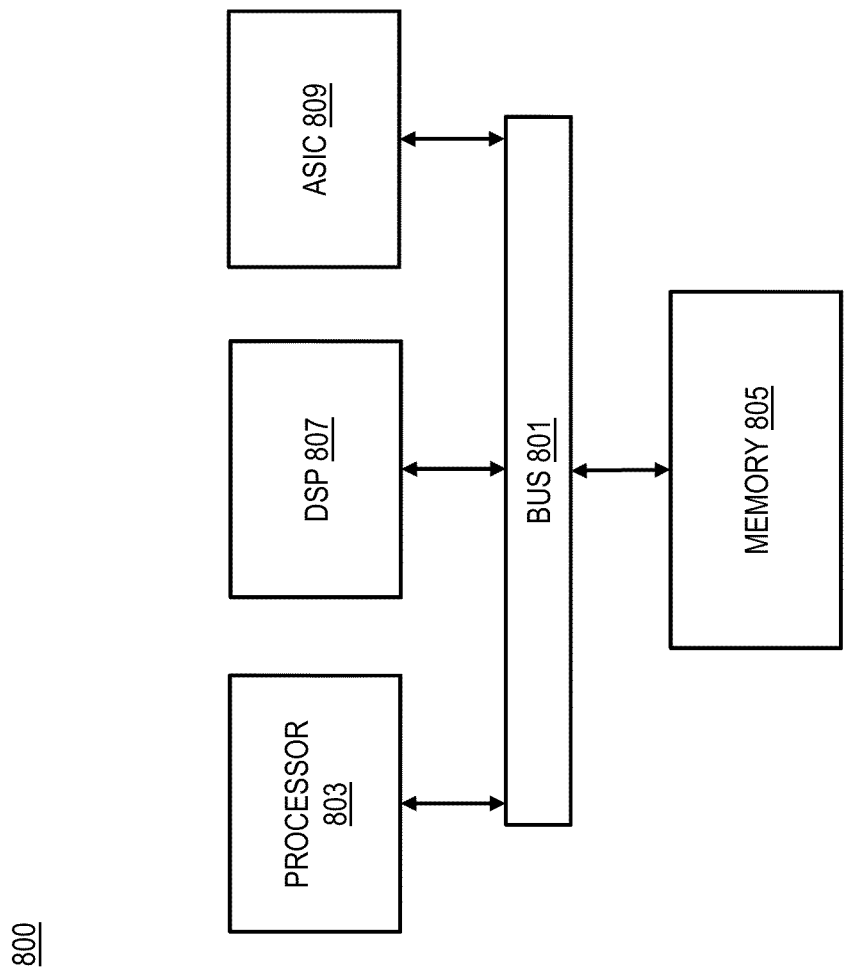
FIG. 9 is a diagram of a chip set that can be used to implement an embodiment of the invention.

FIGS. 4 and 5 are flowcharts of processes for enriching media with meta-information blocks, according to one embodiment. FIG. 4 depicts a process 400 of determining and rendering media. In one embodiment, the media platform 103 performs the process 400 and is implemented in, for instance, a chip set including a processor and a memory as shown in FIG. 9. In step 401, the media platform 103 processes and/or facilitates a processing of one or more media segments of one or more media files to determine characterization data associated with the one or more media segments. In one embodiment, the media platform 103 first segments the one or more media files (e.g., a whole video) based, at least in part, on one or more defined characteristics such as scene disambiguation, topic disambiguation, etc. The media platform 103 then determines meta-information or characterization data associated with the one or more media segments such as topics, annotations, meta-data, context information, etc. In one embodiment, the media platform 103 analyzes the annotation, meta-data, context information, etc. associated with the one or more media segments to build one or more topic descriptions for the one or more media segments. In another embodiment, the media platform 103 may use one or more external sources (e.g., one or more search engines and/or one or more databases) to determine additional annotations, meta-data, etc. related to the one or more media segments.

In step 403, the media platform 103 processes and/or facilitates a processing of the characterization data to determine one or more other media files, one or more other media segments, or a combination thereof. In one embodiment, the media platform 103 determines the one or more other media files, the one or more other media segments, one or more related meta-blocks, or a combination thereof based, at least in part, on the characterization data or meta-information determined for the one or more media segments. By way of example, if one of the segments relates to the topic of elephants, the media platform 103 may be used to determine one or more other media files, one or more other media segments, one or more related meta-blocks, or a combination thereof also related to elephants. In addition, the one or more other media files, the one or more other media segments, the one or more related meta-blocks, or a combination thereof determined by the media platform 103 can be and/or reference any type of media such as audio, videos, images, gesture patterns, advertisements, navigation utilities that are multi-modal, etc.

In step 405, the media platform determines to associate the one or more other media files, the one or more other media segments, or a combination thereof to the one or more media segments, the one or more media file, or a combination thereof as meta-information. In essence, meta-information is information on or about information held within a data set. As previously discussed, the media platform 103 associates additional meta-information to the one or more other media files, the one or more other media segments, the one or more related meta-blocks, or a combination thereof associated with the one or more media files, the one or more media segments, or a combination thereof. By way of example, the meta-information associated by the media platform 103 can describe such aspects of the one or more other media files, the one or more other media segments, the one or more related meta-blocks, or a combination thereof as: relevance of the other media to a media segment; topic information, annotations, and/or tags; rendering styles; context under which the other media is relevant; order of presentation; duration of presentation; filter constraints; priority of presentation with respect to other media types; business model information; linkages to other media; topic blocks; copyright information; and/or other information. Further, in addition to the meta-information associated with the one or more other media files, the one or more other media segments, the one or more related meta-blocks, or a combination thereof by the media platform 103, the media platform 103 also determines the metadata already associated with the one or more other media files, the one or more other media segments, the one or more related meta-blocks, or a combination thereof (e.g., media type, encoding details, time of creation, location data, annotations and tags, duration, ownership, etc.). By way of example, the meta-information associated with the one or more other media files, the one or more other media segments, the one or more related meta-blocks, or a combination thereof may be used by the media platform 103, one or more media services, or one or more rendering engines (e.g., a media player) to service requests or render media.

In step 407, the media platform 103 determines a request from a device to render the one or more media segments, the one or more media files, or a combination thereof. In one example, a user may request to render media related to California. In another example, the user may request to render media related to Disneyland located in Anaheim, Calif.

In step 409, the media platform 103 processes and/or facilitates a processing of (1) the meta-information; (2) context information associated with a device, a user of the device, or a combination thereof; or (3) a combination thereof to determine whether to cause, at least in part, a rendering of the one or more other media segments, the one or more other media files, or a combination thereof. By way of example, the media platform 103 can determine to render an image of "Mickey Mouse" when the segment requested by a user relates to Disneyland located in Anaheim, Calif. even though the whole video being viewed by the user is about a visit to California. Further, in one embodiment, if the media platform 103 determines that a device associated with a user is a mobile device (e.g., a mobile phone) then the media platform 103 may determine to render additional videos as web links to one or more content providers (e.g., YOUTUBE). However, if the media platform 103 determines that the device associated with the user has no connection to the internet (e.g., a television), then the media platform 103 can determine to render the one or more other media files, the one or more other media segments, the one or more related meta-blocks, or a combination thereof as playable content without web links.

In step 411, the media platform 103 determines one or more rendering rules for the one or more media segments, the one or more media files, the one or more other media segments, the one or more other media files, or a combination thereof. As previously discussed, the media platform 103 may determine one or more rendering rules based on the meta-information associated with the one or more media segments, the one or more media files, the one or more related meta-blocks, or a combination thereof determined by the media platform 103 at the onset on the process (e.g., topics, annotations, meta-data, context information, etc.). The rendering rules may also be determined by the media platform 103 based, at least in part, on the meta-information associated with the one or more other media segments, the one or more other media files, the one or more related meta-blocks, or a combination thereof by the media platform 103 such as: relevance of the other media to a media segment; topic information, annotations, and/or tags; rendering styles; context under which the other media is relevant; order of presentation; duration of presentation; filter constraints; priority of presentation with respect to other media types; business model information; linkages to other media; topic blocks; copyright information; and/or other information. Further, the media platform 103 may determine the one or more rendering rules based, at least in part, on the metadata associated with the one or more media segments, the one or more media files, the one or more related meta-blocks, or a combination thereof (e.g., media type, encoding details, time of creation, location data, annotations and tags, duration, ownership, etc.).

In step 413, the media platform 103 causes, at least in part, an inclusion of the one or more rendering rules in the meta-information. As previously discussed, the more meta-information that the media platform 103 is able to associate with the one or more media files, the one or more media segments, the one or more other media files, the one or more other media segments, the one or more related meta-blocks, or a combination, the richer the potential multimedia experience may be for a user.

In step 415, the media platform 103 determines one or more rendering rules, wherein the one or more rendering rules include, at least in part, one or more criteria for initiating a rendering of the one or more media segments, the one or more media files, the one or more other media segments, the one or more other media files, or a combination thereof. In one embodiment, the media platform 103 may determine the one or more criteria based on the meta-information associated with the media to be rendered (e.g., context under which the other media is relevant, order of presentation, etc.). In another embodiment, the media platform 103 may determine the one or more criteria based on a user's traversing one or more topic blocks (i.e., multi-topic links) associated with the media to be rendered. By way of example, between a media "A" and a media "B" the media platform 103 may generate a topic block "A1" that is about topic T0 (e.g., elephants). Moreover, the media platform 103 may also generate topic blocks "B1" and "B2" that are about topics "T1" (e.g., animal migration) and "T2" (e.g., poaching). As a result, the topic choices become "T1=A1+B1" and "T2=A1+B2" and T0 will evolve to "T1" if a user traverses topic block "B1" is selected by a user or "T2" if a user traverses topic block "B2". Thus each topic, and more specifically the initiation of a specific rendering, is influenced by the paths that are taken relative to the one or more topic blocks associated with the one or more other media files, the one or more other media segments, the one or more related meta-blocks, or a combination thereof.

In step 417, the media platform 103 determines one or more rendering rules, wherein the one or more rendering rules specify, at least in part, one or more user interface elements for interacting with the one or more media segments, the one or more media files, the one or more other media segments, the one or more other media files, or a combination thereof. In one embodiment, the media platform 103 can determine that the media requested by a user is a video based, at least in part, on the meta-information and/or metadata associated with the media. As a result, the media platform 103 can then determine that a media player user interface (UI) is required in order to render and/or display the rich media content to the user. More specifically, in one example, the media platform 103 can determine that the one or more user interface elements should include a list of media topics that it can link to including level of hops as well as duration of media dependent upon the hops in order to maximize the richness of the requested media content. An illustrative example of an example user interface is shown in FIG. 7.

FIG. 5 depicts a process 500 of determining and rendering media. In one embodiment, the media platform 103 performs the process 500 and is implemented in, for instance, a chip set including a processor and a memory as shown in FIG. 9. In step 501, the media platform 103 determines one or more relationships among the one or more media segments, the one or more media files, the one or more other media segments, the one or more other media files, or a combination thereof. In one embodiment, the media platform 103 determines the relationships based, at least in part, on the meta-information and/or metadata associated with the media. Further, in one embodiment, the media platform 103 can determine one or more relationships between the media based on any semantic relations that exist between the two media.

In step 503, the media platform 103 causes, at least in part, a generation of one or more topic blocks based, at least in part, on the one or more relationships to link the one or more media segments, the one or more media files, the one or more other media segments, the one or more other media files, or a combination thereof. In one embodiment, the term "topic block" is used to describe a multi-topic link including meta-information that can allow either a render or a service to build composite media (e.g., multi-video mashups) through navigation and analysis of media generated as a result of a user's traversing one or more topic blocks. By way of example, topic blocks can link multiple media based on one or more semantic relations that exist between the two media. More specifically, once the media platform 103 determines information about multiple media (e.g., by analyzing the meta-information associated with the media) and, in particular, where relational overlaps, if any, exist between the media, the media platform 103 can determine to generate one or more topic blocks to link the media. In one embodiment, the one or more topic blocks are used in terms of topic relations, however, there are other services for which one or more topic blocks would be equally relevant.

Figure 6:
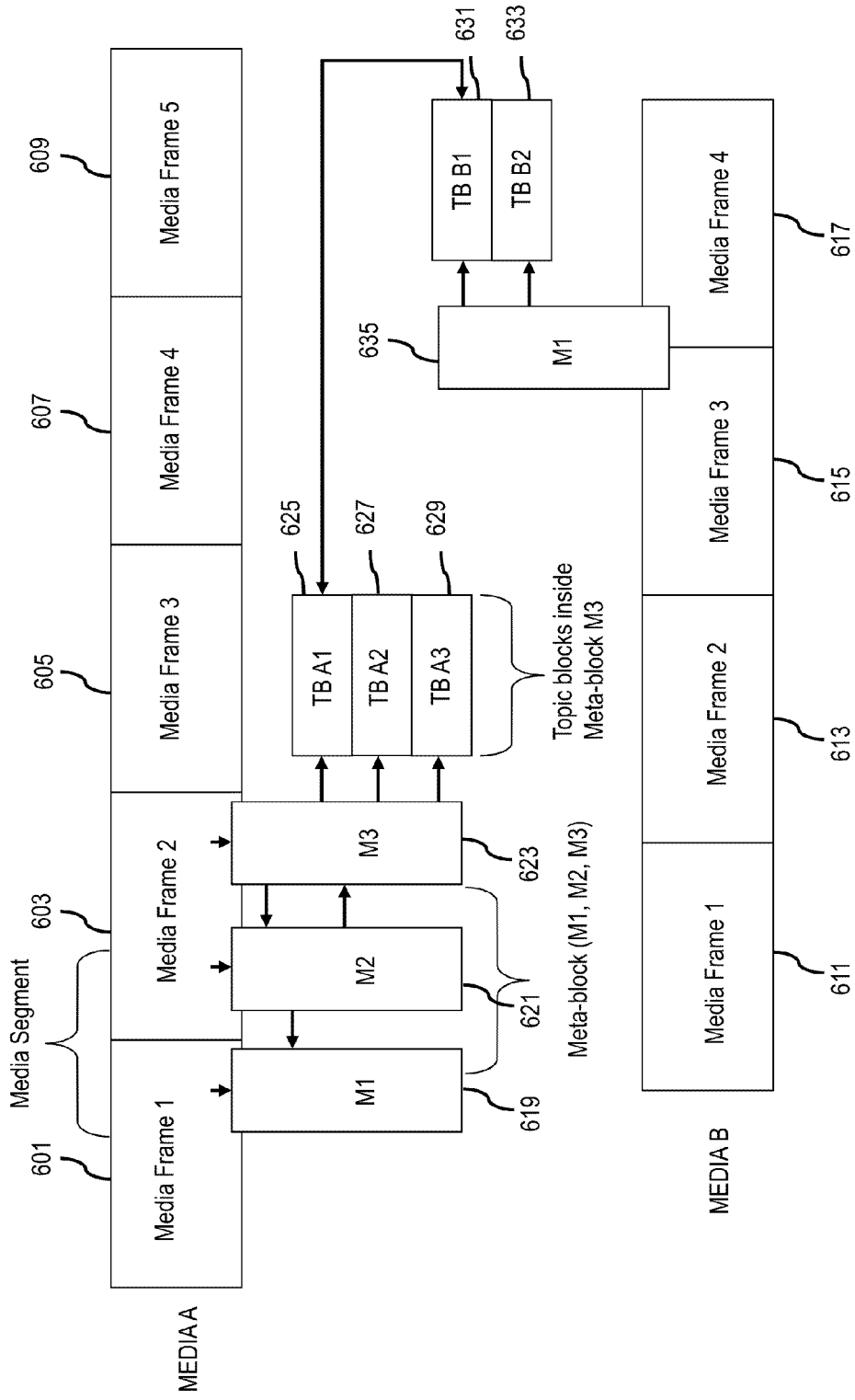
FIG. 6 is a diagram of the components of meta-information blocks utilized in the processes of FIGS. 4 and 5, according to one embodiment.

In step 505, the media platform 103 causes, at least in part, one or more associations of the one or more topic blocks with the one or more media segments, the one or more media files, the one or more other media segments, the one or more other media files, or a combination thereof. In one embodiment, the association between one or more topic blocks and the one or more media segments, the one or more media files, the one or more other media segments, the one or more other media files, the one or more related meta-blocks, or a combination thereof may be based on a topic relation. By way of example, as previously discussed, upon analysis of video segment "A", the media platform 103 may determine to generate a topic block "A1" for the topic of "Elephants" that in some way relates to the content of video segment "A". As previously discussed, the media platform 103 then analyzes one or more media segments, one or more media files, or a combination thereof to determine one or more other media segments, one or more other media files, the one or more related meta-blocks, or a combination thereof to associate with video segment "A". For example, the media platform 103 may determine to generate a topic block "B1" to associate the video segment "A" with an amateur photo "B" of an elephant that is not copyright protected. Further, the media platform 103 may determine to generate a topic block "C1" to associate the video segment "A" and the amateur photo "B" with a professional video "C" that is copyrighted for private viewing only. An illustrative example of the one or more associations between one or more topic blocks and media is shown in FIG. 6.

In step 507, the media platform 103 causes, at least in part, a traversal, an aggregation, or a combination of the one or more topic blocks to determine one or more composite topic blocks. In one embodiment, the media platform 103 can enable a user the ability to build composite topic blocks through, for example, the user traversing "n-number" of linked topic blocks. By way of example, as previously discussed, between a media "A" and a media "B" the media platform 103 may generate topic block "A1" about topic T0 (e.g., elephants), topic block "B1" about topic "T1" (e.g., animal migration), and topic block "B2" about topic "T2" (e.g., animal poaching). Thus, in this instance, if a user determines to traverse the path represented by topic block "B1", the media platform 103 will generate the composite topic block "A1+B1" that will enable the topic T0 to evolve into topic T1. Likewise, if the user determines to traverse the path represented by topic block "B2", the media platform 103 will generate the composite topic block "A1+B2" that will enable the topic T0 to evolve into topic T2.

In step 509, the media platform 103 processes and/or facilitates a processing of the one or more composite topic blocks to cause, at least in part, a generation of one or more composite media files, one or more composite media segments, or a combination thereof from among the one or more media segments, the one or more media files, the one or more other media segments, the one or more other media files, or a combination thereof. As previously discussed, in one embodiment, the media platform 103 generates one or more topic blocks (e.g., "A1", "B1", and "B2") in order to link one or more media (e.g., media "A" and media "B") based, for example, on one or more semantic relations between the media. By way of example, the processing of the composite topic block "A1+B1" by the media platform 103 can generate media related to "elephants" and "animal migration." Similarly, the processing of the composite topic block "A1+B2" by the media platform 103 can generate media related to "elephants" and "animal poaching."

In step 511, the media platform 103 determines a depth of the traversal, the aggregation, or the combination of the one or more topic blocks based, at least in part, on a predetermined number of hops among the one or more topic blocks. In one embodiment, the term "hops" refers to multiple topic links. As previously discussed, as the depth of topic block traversing (i.e., hops) increases, the topics can also change. By way of example, a UI may display the list of media topics that it can link to including level of hops as well as duration of media dependent upon the hops. In one instance, a user may be able to maximize time and computational resources by predetermining a small number of hops, but in another instance the user can maximize potential topic discovery and research possibilities by predetermining a larger number of hops.

In step 513, the media platform 103 determines a hierarchy of the one or more topic blocks, wherein one or more levels of the hierarchy are associated with one or more granularity levels of one or more topics associated with the one or more topic blocks. By way of example, a topic block entitled "Family Vacation" may consist of multiple topic blocks "India," "Airport," and "My Family" representing one or more granularity levels associated with the topic block "Family Vacation." In one embodiment, the media platform 103 may determine a hierarchy within a single topic block. For example, the topic block "Airport" which is related to the topic block "Family Vacation" may have a different set of preferences compared to a topic block "Airport" that is part of the topic block "Civil Aviation."

In step 515, the media platform 103 determines to model one or more user interests based, at least in part, on use information, popularity information, or a combination thereof associated with the one or more topic blocks. By way of example, each topic block generated by the media platform 103 may also contain information about how many times it has been accessed by one or more users and for what purpose.

Depending on usage patterns, one or more probabilistic models can be determined by the media platform 103 that point to interest aspects of one or more users. In step 517, the media platform determines to generate one or more recommendations of the one or more topic blocks based, at least in part, on the model. In one embodiment, the one or more probabilistic models related to one or more users' interest determined by the media platform 103, can be used by the media platform 103 as an additional filter when presenting one or more topic suggestions to a user while he or she is traversing multiple hops or topic blocks, especially when the potential choices become exponentially great.

FIG. 6 is a diagram of the components of meta-information blocks utilized in the processes of FIGS. 4 and 5, according to one embodiment. More specifically, FIG. 6 illustrates the conceptual addition of meta-information to one or more segments of media. As shown, media "A" (e.g., a video) consists of five media frames (e.g., media frames 601, 603, 605, 607, and 609) and media "B" (e.g., a video) consists of four media frames (e.g., media frames 611, 613, 615, and 617). In one embodiment, one segment or sequence (e.g., media frames 601 and 603) constitute a topic (e.g., "T0"). By way of example, three meta-blocks 619, 621, and 623 are determined by the media platform 103 to relate to the media frames 601 and 603 based, for example, on one or more semantic relations and are added by the media platform 103 to the media frames 601 and 603. As previously discussed, each meta-block can contain information about one or more media types (e.g., images, videos, gestures, etc.). Moreover, each media type entry can have one or more media objects or entities. For example, within the video section (e.g., meta-block 623), there can be references to multiple videos with each video entry having its own property and topic block (e.g., topic blocks 625, 627, 629). As previously discussed, topic block 625 can be linked by the media platform 103 with topic block 631 and/or topic block 633 of meta-block 635, which in turn is associated with the media frames 615 and 617 of media "B". Thus, based on a user's traversal of topic blocks 625, 631, and/or 633, the topic "T0" can evolve into topic "T1" or "T2", respectively.

FIG. 7 is a diagram of an example user interface utilized in the processes of FIGS. 4 and 5, according to various embodiments. As shown, the example user interface of FIG. 7 includes one or more user interface elements and/or functionalities created and/or modified based, at least in part, on information, data, and/or signals resulting from the processes (e.g., processes 400 and 500) described with respect to FIGS. 4 and 5. More specifically, FIG. 7 illustrates a user interface (e.g., interface 701) depicting an example of a media player UI that can display rich media content. In one embodiment, the user interface 701 can display the list of media topics that it can link to (e.g., topic 703) including one or more levels of hops (e.g., 705) as well as duration of media dependent upon the hops. More specifically, the user interface 701 shows that the same topic (e.g., elephants) varies when the number of hops increases (e.g., "elephant parks USA" 707 at three hops compared with "elephant parks Florida" 703 at one hop). Further, the user interface 701 demonstrates that there can be multiple topics with different paths or the same path can evolve into different topics depending on the hops traversed.

The processes described herein for enriching media with meta-information blocks may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 8:
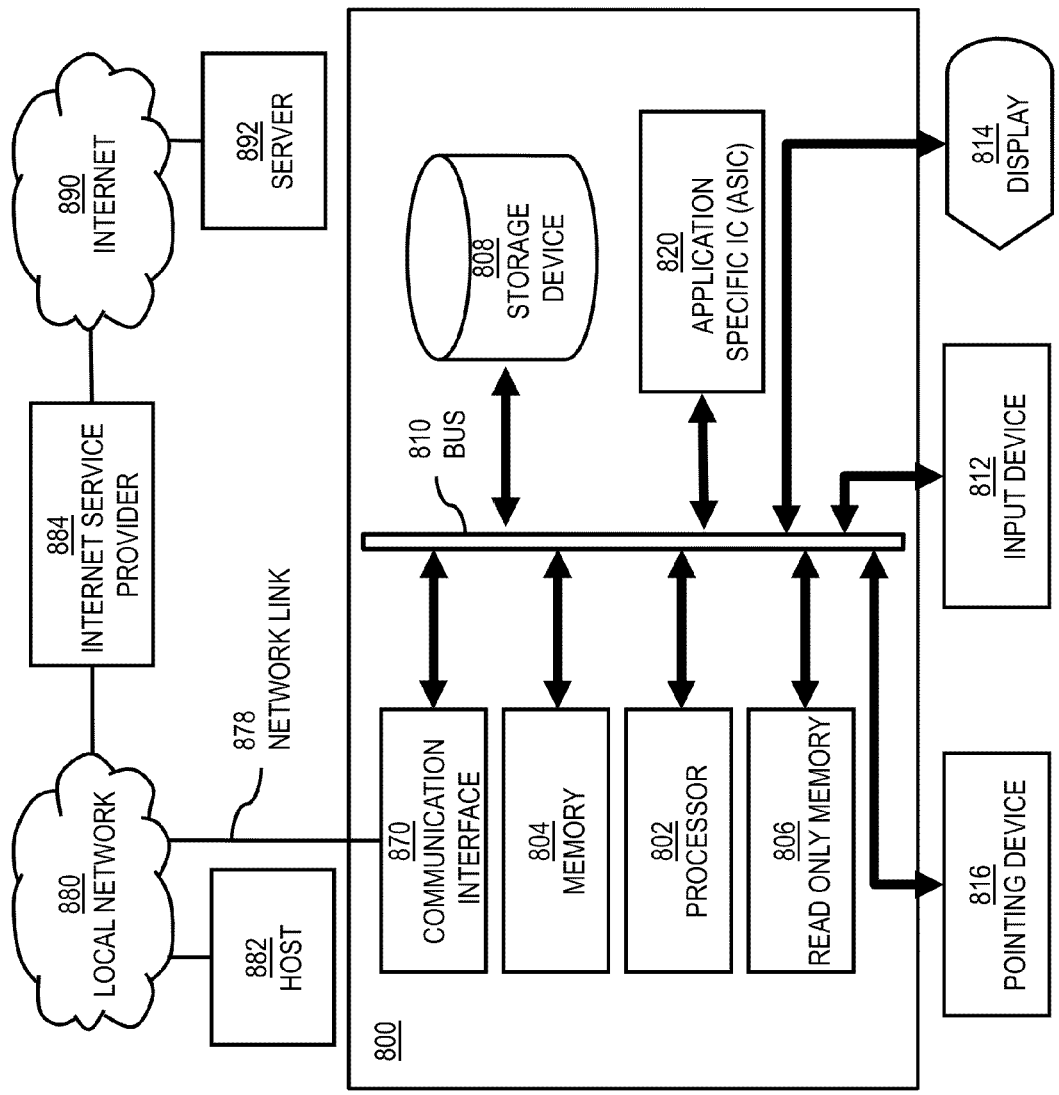
FIG. 8 is a diagram of hardware that can be used to implement an embodiment of the invention.

FIG. 8 illustrates a computer system 800 upon which an embodiment of the invention may be implemented. Although computer system 800 is depicted with respect to a particular device or equipment, it is contemplated that other devices or equipment (e.g., network elements, servers, etc.) within FIG. 8 can deploy the illustrated hardware and components of system 800. Computer system 800 is programmed (e.g., via computer program code or instructions) to enrich media with meta-information blocks as described herein and includes a communication mechanism such as a bus 810 for passing information between other internal and external components of the computer system 800. Information (also called data) is represented as a physical expression of a measurable phenomenon, typically electric voltages, but including, in other embodiments, such phenomena as magnetic, electromagnetic, pressure, chemical, biological, molecular, atomic, subatomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 800, or a portion thereof, constitutes a means for performing one or more steps of enriching media with meta-information blocks.

A bus 810 includes one or more parallel conductors of information so that information is transferred quickly among devices coupled to the bus 810. One or more processors 802 for processing information are coupled with the bus 810.

A processor (or multiple processors) 802 performs a set of operations on information as specified by computer program code related to enrich media with meta-information blocks. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 810 and placing information on the bus 810. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 802, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 800 also includes a memory 804 coupled to bus 810. The memory 804, such as a random access memory (RAM) or any other dynamic storage device, stores information including processor instructions for enriching media with meta-information blocks. Dynamic memory allows information stored therein to be changed by the computer system 800. RAM allows a unit of information stored at a location called a memory address to be stored and retrieved independently of information at neighboring addresses. The memory 804 is also used by the processor 802 to store temporary values during execution of processor instructions. The computer system 800 also includes a read only memory (ROM) 806 or any other static storage device coupled to the bus 810 for storing static information, including instructions, that is not changed by the computer system 800. Some memory is composed of volatile storage that loses the information stored thereon when power is lost. Also coupled to bus 810 is a non-volatile (persistent) storage device 808, such as a magnetic disk, optical disk or flash card, for storing information, including instructions, that persists even when the computer system 800 is turned off or otherwise loses power.

Information, including instructions for enriching media with meta-information blocks, is provided to the bus 810 for use by the processor from an external input device 812, such as a keyboard containing alphanumeric keys operated by a human user, a microphone, an Infrared (IR) remote control, a joystick, a game pad, a stylus pen, a touch screen, or a sensor. A sensor detects conditions in its vicinity and transforms those detections into physical expression compatible with the measurable phenomenon used to represent information in computer system 800. Other external devices coupled to bus 810, used primarily for interacting with humans, include a display device 814, such as a cathode ray tube (CRT), a liquid crystal display (LCD), a light emitting diode (LED) display, an organic LED (OLED) display, a plasma screen, or a printer for presenting text or images, and a pointing device 816, such as a mouse, a trackball, cursor direction keys, or a motion sensor, for controlling a position of a small cursor image presented on the display 814 and issuing commands associated with graphical elements presented on the display 814. In some embodiments, for example, in embodiments in which the computer system 800 performs all functions automatically without human input, one or more of external input device 812, display device 814 and pointing device 816 is omitted.

In the illustrated embodiment, special purpose hardware, such as an application specific integrated circuit (ASIC) 820, is coupled to bus 810. The special purpose hardware is configured to perform operations not performed by processor 802 quickly enough for special purposes. Examples of ASICs include graphics accelerator cards for generating images for display 814, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 800 also includes one or more instances of a communications interface 870 coupled to bus 810. Communication interface 870 provides a one-way or two-way communication coupling to a variety of external devices that operate with their own processors, such as printers, scanners and external disks. In general the coupling is with a network link 878 that is connected to a local network 880 to which a variety of external devices with their own processors are connected. For example, communication interface 870 may be a parallel port or a serial port or a universal serial bus (USB) port on a personal computer. In some embodiments, communications interface 870 is an integrated services digital network (ISDN) card or a digital subscriber line (DSL) card or a telephone modem that provides an information communication connection to a corresponding type of telephone line. In some embodiments, a communication interface 870 is a cable modem that converts signals on bus 810 into signals for a communication connection over a coaxial cable or into optical signals for a communication connection over a fiber optic cable. As another example, communications interface 870 may be a local area network (LAN) card to provide a data communication connection to a compatible LAN, such as Ethernet. Wireless links may also be implemented. For wireless links, the communications interface 870 sends or receives or both sends and receives electrical, acoustic or electromagnetic signals, including infrared and optical signals, that carry information streams, such as digital data. For example, in wireless handheld devices, such as mobile telephones like cell phones, the communications interface 870 includes a radio band electromagnetic transmitter and receiver called a radio transceiver. In certain embodiments, the communications interface 870 enables connection to the communication network 105 for enriching media with meta-information blocks to the UE 101.

The term "computer-readable medium" as used herein refers to any medium that participates in providing information to processor 802, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 808. Volatile media include, for example, dynamic memory 804. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 820.

Network link 878 typically provides information communication using transmission media through one or more networks to other devices that use or process the information. For example, network link 878 may provide a connection through local network 880 to a host computer 882 or to equipment 884 operated by an Internet Service Provider (ISP). ISP equipment 884 in turn provides data communication services through the public, world-wide packet-switching communication network of networks now commonly referred to as the Internet 890.

A computer called a server host 892 connected to the Internet hosts a process that provides a service in response to information received over the Internet. For example, server host 892 hosts a process that provides information representing video data for presentation at display 814. It is contemplated that the components of system 800 can be deployed in various configurations within other computer systems, e.g., host 882 and server 892.

At least some embodiments of the invention are related to the use of computer system 800 for implementing some or all of the techniques described herein. According to one embodiment of the invention, those techniques are performed by computer system 800 in response to processor 802 executing one or more sequences of one or more processor instructions contained in memory 804. Such instructions, also called computer instructions, software and program code, may be read into memory 804 from another computer-readable medium such as storage device 808 or network link 878. Execution of the sequences of instructions contained in memory 804 causes processor 802 to perform one or more of the method steps described herein. In alternative embodiments, hardware, such as ASIC 820, may be used in place of or in combination with software to implement the invention. Thus, embodiments of the invention are not limited to any specific combination of hardware and software, unless otherwise explicitly stated herein.

The signals transmitted over network link 878 and other networks through communications interface 870, carry information to and from computer system 800. Computer system 800 can send and receive information, including program code, through the networks 880, 890 among others, through network link 878 and communications interface 870. In an example using the Internet 890, a server host 892 transmits program code for a particular application, requested by a message sent from computer 800, through Internet 890, ISP equipment 884, local network 880 and communications interface 870. The received code may be executed by processor 802 as it is received, or may be stored in memory 804 or in storage device 808 or any other non-volatile storage for later execution, or both. In this manner, computer system 800 may obtain application program code in the form of signals on a carrier wave.

Various forms of computer readable media may be involved in carrying one or more sequence of instructions or data or both to processor 802 for execution. For example, instructions and data may initially be carried on a magnetic disk of a remote computer such as host 882. The remote computer loads the instructions and data into its dynamic memory and sends the instructions and data over a telephone line using a modem. A modem local to the computer system 800 receives the instructions and data on a telephone line and uses an infra-red transmitter to convert the instructions and data to a signal on an infra-red carrier wave serving as the network link 878. An infrared detector serving as communications interface 870 receives the instructions and data carried in the infrared signal and places information representing the instructions and data onto bus 810. Bus 810 carries the information to memory 804 from which processor 802 retrieves and executes the instructions using some of the data sent with the instructions. The instructions and data received in memory 804 may optionally be stored on storage device 808, either before or after execution by the processor 802.

FIG. 9 illustrates a chip set or chip 900 upon which an embodiment of the invention may be implemented. Chip set 900 is programmed to enrich media with meta-information blocks as described herein and includes, for instance, the processor and memory components described with respect to FIG. 8 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 900 can be implemented in a single chip. It is further contemplated that in certain embodiments the chip set or chip 900 can be implemented as a single "system on a chip." It is further contemplated that in certain embodiments a separate ASIC would not be used, for example, and that all relevant functions as disclosed herein would be performed by a processor or processors. Chip set or chip 900, or a portion thereof, constitutes a means for performing one or more steps of providing user interface navigation information associated with the availability of functions. Chip set or chip 900, or a portion thereof, constitutes a means for performing one or more steps of enriching media with meta-information blocks.

In one embodiment, the chip set or chip 900 includes a communication mechanism such as a bus 901 for passing information among the components of the chip set 900. A processor 903 has connectivity to the bus 901 to execute instructions and process information stored in, for example, a memory 905. The processor 903 may include one or more processing cores with each core configured to perform independently. A multi-core processor enables multiprocessing within a single physical package. Examples of a multi-core processor include two, four, eight, or greater numbers of processing cores. Alternatively or in addition, the processor 903 may include one or more microprocessors configured in tandem via the bus 901 to enable independent execution of instructions, pipelining, and multithreading. The processor 903 may also be accompanied with one or more specialized components to perform certain processing functions and tasks such as one or more digital signal processors (DSP) 907, or one or more application-specific integrated circuits (ASIC) 909. A DSP 907 typically is configured to process real-world signals (e.g., sound) in real time independently of the processor 903. Similarly, an ASIC 909 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one embodiment, the chip set or chip 900 includes merely one or more processors and some software and/or firmware supporting and/or relating to and/or for the one or more processors.

The processor 903 and accompanying components have connectivity to the memory 905 via the bus 901. The memory 905 includes both dynamic memory (e.g., RAM, magnetic disk, writable optical disk, etc.) and static memory (e.g., ROM, CD-ROM, etc.) for storing executable instructions that when executed perform the inventive steps described herein to enrich media with meta-information blocks. The memory 905 also stores the data associated with or generated by the execution of the inventive steps.

FIG. 10 is a diagram of exemplary components of a mobile terminal (e.g., handset) for communications, which is capable of operating in the system of FIG. 1, according to one embodiment. In some embodiments, mobile terminal 1001, or a portion thereof, constitutes a means for performing one or more steps of enriching media with meta-information blocks. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 1003, a Digital Signal Processor (DSP) 1005, and a receiver/transmitter unit including a microphone gain control unit and a speaker gain control unit. A main display unit 1007 provides a display to the user in support of various applications and mobile terminal functions that perform or support the steps of enriching media with meta-information blocks. The display 1007 includes display circuitry configured to display at least a portion of a user interface of the mobile terminal (e.g., mobile telephone). Additionally, the display 1007 and display circuitry are configured to facilitate user control of at least some functions of the mobile terminal. An audio function circuitry 1009 includes a microphone 1011 and microphone amplifier that amplifies the speech signal output from the microphone 1011. The amplified speech signal output from the microphone 1011 is fed to a coder/decoder (CODEC) 1013.

A radio section 1015 amplifies power and converts frequency in order to communicate with a base station, which is included in a mobile communication system, via antenna 1017. The power amplifier (PA) 1019 and the transmitter/modulation circuitry are operationally responsive to the MCU 1003, with an output from the PA 1019 coupled to the duplexer 1021 or circulator or antenna switch, as known in the art. The PA 1019 also couples to a battery interface and power control unit 1020.

In use, a user of mobile terminal 1001 speaks into the microphone 1011 and his or her voice along with any detected background noise is converted into an analog voltage. The analog voltage is then converted into a digital signal through the Analog to Digital Converter (ADC) 1023. The control unit 1003 routes the digital signal into the DSP 1005 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 1025 for compensation of any frequency-dependent impairments that occur during transmission though the air such as phase and amplitude distortion. After equalizing the bit stream, the modulator 1027 combines the signal with a RF signal generated in the RF interface 1029. The modulator 1027 generates a sine wave by way of frequency or phase modulation. In order to prepare the signal for transmission, an up-converter 1031 combines the sine wave output from the modulator 1027 with another sine wave generated by a synthesizer 1033 to achieve the desired frequency of transmission. The signal is then sent through a PA 1019 to increase the signal to an appropriate power level. In practical systems, the PA 1019 acts as a variable gain amplifier whose gain is controlled by the DSP 1005 from information received from a network base station. The signal is then filtered within the duplexer 1021 and optionally sent to an antenna coupler 1035 to match impedances to provide maximum power transfer. Finally, the signal is transmitted via antenna 1017 to a local base station. An automatic gain control (AGC) can be supplied to control the gain of the final stages of the receiver. The signals may be forwarded from there to a remote telephone which may be another cellular telephone, any other mobile phone or a landline connected to a Public Switched Telephone Network (PSTN), or other telephony networks.

Voice signals transmitted to the mobile terminal 1001 are received via antenna 1017 and immediately amplified by a low noise amplifier (LNA) 1037. A down-converter 1039 lowers the carrier frequency while the demodulator 1041 strips away the RF leaving only a digital bit stream. The signal then goes through the equalizer 1025 and is processed by the DSP 1005. A Digital to Analog Converter (DAC) 1043 converts the signal and the resulting output is transmitted to the user through the speaker 1045, all under control of a Main Control Unit (MCU) 1003 which can be implemented as a Central Processing Unit (CPU).

The MCU 1003 receives various signals including input signals from the keyboard 1047. The keyboard 1047 and/or the MCU 1003 in combination with other user input components (e.g., the microphone 1011) comprise a user interface circuitry for managing user input. The MCU 1003 runs a user interface software to facilitate user control of at least some functions of the mobile terminal 1001 to enrich media with meta-information blocks. The MCU 1003 also delivers a display command and a switch command to the display 1007 and to the speech output switching controller, respectively. Further, the MCU 1003 exchanges information with the DSP 1005 and can access an optionally incorporated SIM card 1049 and a memory 1051. In addition, the MCU 1003 executes various control functions required of the terminal. The DSP 1005 may, depending upon the implementation, perform any of a variety of conventional digital processing functions on the voice signals. Additionally, DSP 1005 determines the background noise level of the local environment from the signals detected by microphone 1011 and sets the gain of microphone 1011 to a level selected to compensate for the natural tendency of the user of the mobile terminal 1001.

The CODEC 1013 includes the ADC 1023 and DAC 1043. The memory 1051 stores various data including call incoming tone data and is capable of storing other data including music data received via, e.g., the global Internet. The software module could reside in RAM memory, flash memory, registers, or any other form of writable storage medium known in the art. The memory device 1051 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 1049 carries, for instance, important information, such as the cellular phone number, the carrier supplying service, subscription details, and security information. The SIM card 1049 serves primarily to identify the mobile terminal 1001 on a radio network.

The card 1049 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising facilitating a processing of and/or processing (1) data and/or (2) information and/or (3) at least one signal, the (1) data and/or (2) information and/or (3) at least one signal based, at least in part, on the following:
    a processing of one or more media segments of one or more media files to determine characterization data associated with the one or more media segments;
    a processing of the characterization data to determine one or more other media files, one or more other media segments, or a combination thereof;
    at least one determination to associate the one or more other media files, the one or more other media segments, or a combination thereof to the one or more media segments, the one or more media files, or a combination thereof as meta-information;
    a determination of one or more relationships among the one or more media segments, the one or more media files, the one or more other media segments, the one or more other media files, or a combination thereof;
    a generation of one or more topic blocks based, at least in part, on the one or more relationships to link the one or more media segments, the one or more media files, the one or more other media segments, the one or more other media files, or a combination thereof; and
    a traversal, an aggregation, or a combination of the one or more topic blocks in real time as a user traversing along links among the one or more topic blocks to determine one or more composite topic blocks.

2. A method of claim 1, wherein the (1) data and/or (2) information and/or (3) at least one signal are further based, at least in part, on the following:
    at least one determination of a request from a device to render the one or more media segments, the one or more media files, or a combination thereof; and
    a processing of (1) the meta-information; (2) context information associated with a device, a user of the device, or a combination thereof; or (3) a combination thereof to determine whether to cause, at least in part, a rendering of the one or more other media segments, the one or more other media files, or a combination thereof,
    wherein the meta-information includes one or more gesture patterns, one or more navigation utilities that are multimodal, business model information, or a combination thereof.

3. A method of claim 1, wherein the (1) data and/or (2) information and/or (3) at least one signal are further based, at least in part, on the following:
    at least one determination of one or more rendering rules for the one or more media segments, the one or more media files, the one or more other media segments, the one or more other media files, or a combination thereof; and
    an inclusion of the one or more rendering rules in the meta-information.

4. A method of claim 3, wherein the one or more rendering rules include, at least in part, one or more criteria for initiating a rendering of the one or more media segments, the one or more media files, the one or more other media segments, the one or more other media files, or a combination thereof.

5. A method of claim 3, wherein the one or more rendering rules specify, at least in part, one or more user interface elements for interacting with the one or more media segments, the one or more media files, the one or more other media segments, the one or more other media files, or a combination thereof.

6. A method of claim 1, wherein the (1) data and/or (2) information and/or (3) at least one signal are further based, at least in part, on the following:
    one or more associations of the one or more topic blocks with the one or more media segments, the one or more media files, the one or more other media segments, the one or more other media files, or a combination thereof,
    wherein the one or more relationships include one or more semantic relationships.

7. A method of claim 6, wherein the (1) data and/or (2) information and/or (3) at least one signal are further based, at least in part, on the following:
    a processing of the one or more composite topic blocks to cause, at least in part, a generation of one or more composite media files, one or more composite media segments, or a combination thereof from among the one or more media segments, the one or more media files, the one or more other media segments, the one or more other media files, or a combination thereof.

8. A method of claim 7, wherein the (1) data and/or (2) information and/or (3) at least one signal are further based, at least in part, on the following:
    at least one determination of a depth of the traversal, the aggregation, or the combination of the one or more topic blocks based, at least in part, on a predetermined number of hops among the one or more topic blocks.

9. A method of claim 6, wherein the (1) data and/or (2) information and/or (3) at least one signal are further based, at least in part, on the following:
    at least one determination of a hierarchy of the one or more topic blocks,
    wherein one or more levels of the hierarchy are associated with one or more granularity levels of one or more topics associated with the one or more topic blocks.

10. A method of claim 6, wherein the (1) data and/or (2) information and/or (3) at least one signal are further based, at least in part, on the following:
    at least one determination to model one or more user interests based, at least in part, on use information, popularity information, or a combination thereof associated with the one or more topic blocks; and
    at least one determination to generate one or more recommendations of the one or more topic blocks based, at least in part, on the model.

11. An apparatus comprising:
    at least one processor; and
    at least one memory including computer program code for one or more programs,
    the at least one memory and the computer program code configured to, with the at least one processor, cause the apparatus to perform at least the following,
        process and/or facilitate a processing of one or more media segments of one or more media files to determine characterization data associated with the one or more media segments;

process and/or facilitate a processing of the characterization data to determine one or more other media files, one or more other media segments, or a combination thereof;

determine to associate the one or more other media files, the one or more other media segments, or a combination thereof to the one or more media segments, the one or more media files, or a combination thereof as meta-information;

determine one or more relationships among the one or more media segments, the one or more media files, the one or more other media segments, the one or more other media files, or a combination thereof;

cause, at least in part, a generation of one or more topic blocks based, at least in part, on the one or more relationships to link the one or more media segments, the one or more media files, the one or more other media segments, the one or more other media files, or a combination thereof; and cause, at least in part, a traversal, an aggregation, or a combination of the one or more topic blocks in real time as a user traversing along links among the one or more topic blocks to determine one or more composite topic blocks.

12. An apparatus of claim 11, wherein the apparatus is further caused to:

determine a request from a device to render the one or more media segments, the one or more media files, or a combination thereof;

process and/or facilitate a processing of (1) the meta-information; (2) context information associated with a device, a user of the device, or a combination thereof; or (3) a combination thereof to determine whether to cause, at least in part, a rendering of the one or more other media segments, the one or more other media files, or a combination thereof.

13. An apparatus of claim 11, wherein the apparatus is further caused to:

determine one or more rendering rules for the one or more media segments, the one or more media files, the one or more other media segments, the one or more other media files, or a combination thereof; and cause, at least in part, an inclusion of the one or more rendering rules in the meta-information.

14. An apparatus of claim 13, wherein the one or more rendering rules include, at least in part, one or more criteria for initiating a rendering of the one or more media segments, the one or more media files, the one or more other media segments, the one or more other media files, or a combination thereof.

15. An apparatus of claim 13, wherein the one or more rendering rules specify, at least in part, one or more user interface elements for interacting with the one or more media segments, the one or more media files, the one or more other media segments, the one or more other media files, or a combination thereof.

16. An apparatus of claim 11, wherein the apparatus is further caused to:

cause, at least in part, one or more associations of the one or more topic blocks with the one or more media segments, the one or more media files, the one or more other media segments, the one or more other media files, or a combination thereof.

17. An apparatus of claim 16, wherein the apparatus is further caused to:

process and/or facilitate a processing of the one or more composite topic blocks to cause, at least in part, a generation of one or more composite media files, one or more composite media segments, or a combination thereof from among the one or more media segments, the one or more media files, the one or more other media segments, the one or more other media files, or a combination thereof.

18. An apparatus of claim 17, wherein the apparatus is further caused to:

determine a depth of the traversal, the aggregation, or the combination of the one or more topic blocks based, at least in part, on a predetermined number of hops among the one or more topic blocks.

19. An apparatus of claim 16, wherein the apparatus is further caused to:

determine a hierarchy of the one or more topic blocks, wherein one or more levels of the hierarchy are associated with one or more granularity levels of one or more topics associated with the one or more topic blocks.

20. An apparatus of claim 16, wherein the apparatus is further caused to:

determine to model one or more user interests based, at least in part, on use information, popularity information, or a combination thereof associated with the one or more topic blocks; and determine to generate one or more recommendations of the one or more topic blocks based, at least in part, on the model.

* * * * *